(12) United States Patent  
Heit et al.

(10) Patent No.: US 8,995,012 B2  
(45) Date of Patent: Mar. 31, 2015

(54) SYSTEM FOR MOBILE IMAGE CAPTURE AND PROCESSING OF FINANCIAL DOCUMENTS

(75) Inventors: Graham Heit, Waterloo (CA); Dhammika Botejue, Waterloo (CA); Frank McGovern, Waterloo (CA); Dima Shamroni, Waterloo (CA)

(73) Assignee: RDM Corporation, Waterloo, Ontario (CA)

( * ) Notice: Subject to any disclaimer, the term of this patent is extended or adjusted under 35 U.S.C. 154(b) by 579 days.

(21) Appl. No.: 12/940,739

(22) Filed: Nov. 5, 2010

(65) Prior Publication Data

US 2012/0113489 A1    May 10, 2012

(51) Int. Cl.
| | |
|---|---|
| *H04N 1/60* | (2006.01) |
| *G03F 3/08* | (2006.01) |
| *G06K 9/00* | (2006.01) |
| *G06K 9/22* | (2006.01) |
| *G06K 9/18* | (2006.01) |
| *G06K 9/32* | (2006.01) |

(52) U.S. Cl.
CPC ............... *G06K 9/222* (2013.01); *G06K 9/186* (2013.01); *G06K 9/3208* (2013.01)
USPC ............. 358/1.9; 358/518; 382/137; 382/167

(58) Field of Classification Search
None
See application file for complete search history.

(56) References Cited

U.S. PATENT DOCUMENTS

| | | | |
|---|---|---|---|
| 5,208,869 A * | 5/1993 | Holt ............................... | 382/138 |
| 5,721,790 A * | 2/1998 | Klenner ........................ | 382/138 |
| 5,761,686 A | 6/1998 | Bloomberg | |
| 5,784,503 A * | 7/1998 | Bleecker et al. .............. | 382/306 |
| 5,940,844 A * | 8/1999 | Cahill et al. .................. | 715/268 |
| 6,038,553 A | 3/2000 | Hyde, Jr. | |
| 6,735,341 B1 | 5/2004 | Horie et al. | |
| 6,807,294 B2 | 10/2004 | Yamazaki | |
| 6,947,610 B2 | 9/2005 | Sun | |
| 6,985,631 B2 | 1/2006 | Zhang | |
| 7,301,564 B2 | 11/2007 | Fan | |
| 7,331,523 B2 | 2/2008 | Meier et al. | |
| 7,377,425 B1 | 5/2008 | Ma et al. | |
| 7,469,824 B1 * | 12/2008 | Crews et al. .................. | 235/379 |
| 7,593,595 B2 | 9/2009 | Heaney, Jr. et al. | |
| 7,606,741 B2 | 10/2009 | King et al. | |
| 7,606,762 B1 * | 10/2009 | Heit ............................... | 705/39 |

(Continued)

FOREIGN PATENT DOCUMENTS

| | | |
|---|---|---|
| KR | 1020040076131 A1 | 8/2004 |
| WO | WO 2006/075967 A1 | 7/2006 |
| WO | WO 2006/136958 A2 | 12/2006 |

*Primary Examiner* — Madelein A Nguyen
(74) *Attorney, Agent, or Firm* — Haynes and Boone, LLP.

(57) ABSTRACT

An automated document processing system, particularly for mobile image capture and processing of financial documents to enhance images captured on a mobile device with camera capabilities for data extraction. The systems comprise a mobile device that includes a capture device configured to capture color images of documents, and that has a processor for performing certain operations, such as color reduction, and a transmitter for sending an image from the mobile device to a server. The server is configured to optimize and enhance the image, and to apply an improved binarization algorithm using a window within a relevant document field and/or a threshold for the document field. Orientation correction may also be performed at the server by reading the MICR line on a check and comparing a MICR confidence to a threshold. A check image may also be size corrected using features of the MICR line and expected document dimensions.

9 Claims, 25 Drawing Sheets

(56) References Cited

U.S. PATENT DOCUMENTS

| | | |
|---|---|---|
| 7,778,457 B2 | 8/2010 | Nepomniachtchi et al. |
| 7,793,831 B2 | 9/2010 | Beskitt |
| 8,437,532 B1 * | 5/2013 | Jones et al. .................... 382/138 |
| 2002/0012462 A1 | 1/2002 | Fujiwara |
| 2002/0041717 A1 | 4/2002 | Murata et al. |
| 2002/0067846 A1 | 6/2002 | Foley |
| 2003/0086615 A1 | 5/2003 | Dance et al. |
| 2004/0012679 A1 | 1/2004 | Fan |
| 2005/0097046 A1 | 5/2005 | Singfield |
| 2005/0143136 A1 | 6/2005 | Lev et al. |
| 2005/0242186 A1 | 11/2005 | Ohbuchi |
| 2005/0261990 A1 | 11/2005 | Gocht et al. |
| 2006/0045379 A1 | 3/2006 | Heaney, Jr. et al. |
| 2006/0140504 A1 | 6/2006 | Fujimoto et al. |
| 2006/0164682 A1 | 7/2006 | Lev |
| 2006/0210192 A1 | 9/2006 | Orhun |
| 2006/0221415 A1 | 10/2006 | Kawamoto |
| 2006/0291727 A1 | 12/2006 | Bargeron |
| 2007/0084911 A1 | 4/2007 | Crowell |
| 2007/0171288 A1 | 7/2007 | Inoue et al. |
| 2007/0206877 A1 | 9/2007 | Wu et al. |
| 2008/0062437 A1 | 3/2008 | Rizzo |
| 2009/0092322 A1 | 4/2009 | Erol et al. |
| 2009/0185241 A1 * | 7/2009 | Nepomniachtchi ........... 358/474 |
| 2009/0185736 A1 * | 7/2009 | Nepomniachtchi ........... 382/137 |
| 2009/0185737 A1 * | 7/2009 | Nepomniachtchi ........... 382/139 |
| 2009/0185738 A1 * | 7/2009 | Nepomniachtchi ........... 382/140 |
| 2009/0261158 A1 | 10/2009 | Lawson |
| 2010/0073735 A1 | 3/2010 | Hunt et al. |
| 2010/0104171 A1 | 4/2010 | Faulkner et al. |
| 2010/0150424 A1 * | 6/2010 | Nepomniachtchi et al. .. 382/140 |
| 2011/0091092 A1 * | 4/2011 | Nepomniachtchi et al. .. 382/139 |
| 2011/0194750 A1 * | 8/2011 | Nepomniachtchi ........... 382/137 |
| 2013/0022231 A1 * | 1/2013 | Nepomniachtchi et al. .. 382/102 |
| 2013/0051610 A1 * | 2/2013 | Roach et al. .................. 382/100 |
| 2013/0085935 A1 * | 4/2013 | Nepomniachtchi et al. .... 705/40 |
| 2013/0094751 A1 * | 4/2013 | Nepomniachtchi ........... 382/137 |
| 2013/0155474 A1 * | 6/2013 | Roach et al. .................. 358/505 |
| 2013/0223721 A1 * | 8/2013 | Nepomniachtchi et al. .. 382/138 |
| 2014/0032406 A1 * | 1/2014 | Roach et al. .................... 705/42 |
| 2014/0086455 A1 * | 3/2014 | Kotovich et al. ............. 382/112 |
| 2014/0099001 A1 * | 4/2014 | Nepomniachtchi et al. .. 382/112 |

* cited by examiner

800

Jonnie Kash
246 Somewhere Dr.
Somewhere City, CA 12312
614-555-9223

1329

Date *11-12-06*

Pay to the order of  *S. D. G. & E.*    Amount  $ *46.11*

*Forty six and 11/100*                                Dollars

Bank Two
8911 Balboa Ave,
San Diego, CA 92116
800-246-8900

Memo _____     *Jonnie Kash*

John Smith
000123456789
WE-1

| A LATE FEE MAY APPLY TO PAYMENTS RECEIVED AFTER: 12-17-07 ||| 
|---|---|---|
| BALANCE | MINIMUM PMT. | INTEREST |
| $ 715.50 | $ 238.40 | $ 79.43 |
| AMOUNT ENCLOSED  $ |||
| MAKE CHECK PAYABLE TO: BANK TWO |||

Bank Two
8911 Balboa Ave,
San Diego, CA 92116

(The Check within the Figure is Intentionally in Landscape Orientation)

(The Figure is Intentionally Bi-Tonal)

(This Figure is Intentionally Oriented Up-side Down)

SYSTEM FOR MOBILE IMAGE CAPTURE AND PROCESSING OF FINANCIAL DOCUMENTS

FIELD OF THE INVENTION

The present disclosure relates generally to an automated document processing system and more particularly, a system for mobile image capture and processing of financial documents to enhance an image for data extraction from images captured on a mobile device with camera capabilities.

BACKGROUND OF THE INVENTION

In general, financial institutions have automated most check processing systems by printing financial information, such as account numbers and bank routing numbers, onto the checks. Before a check amount is deducted from a payer's account, the amount, account number, and other important information must be extracted from the check. This highly automated form of extraction is done by a check processing control system that captures information from the Magnetic Ink Character Recognition ("MICR") line. The MICR line consists of specially designed numerals that are printed on the bottom of a check using magnetic ink. The MICR data fields include the bank routing number, bank transit number, account number, check serial number, check amount, process code and extended process code.

Checks and other documents may be processed by banks and other financial institutions in large numbers. The documents that may be processed might include checks, deposit slips, payment slips, etc. In some cases the banks or other financial institutions may be required to use the actual physical documents. For example, checks might need to be transported between multiple banks or other financial institutions. This may slow down the processing of financial documents. In addition, other types of documents that are non-financial in nature may be processed by businesses and other institutions in large volumes.

In order to facilitate processing of a document depicted in an image captured by a mobile device, image optimization and enhancement processing operations must be applied such that data can be extracted from the document. One approach to processing images captured from a mobile device is described in U.S. Pat. No. 7,778,457 to Nepomniachtchi et al., hereby incorporated by reference.

Nepomniachtchi et al. discloses either performing multiple image processing steps on a mobile device or transmitting large color images to a server. Mobile devices are often limited in terms of available processing power and transmission bandwidth. Performing multiple image processing operations on a mobile device can may take a long time due to the limited processing power and prevent the user from effectively performing other tasks on the mobile device. Similarly, sending images with a large file size will also take a long time and limit the communication functions of the mobile device while the image is being transmitted.

Nepomniachtchi et al. also discloses an algorithm for binarizing an image that applies the same algorithm to the entire document. Unfortunately, many images present complex backgrounds or weak image foregrounds (some foreground pixels have gray values very close to those of some background pixels). In such cases, it is not possible to find a single threshold or window that completely separates the foreground image from the background. This results in background noise in the bi-tonal image. In addition, certain document fields may be read by a computer process such that these areas should have limited background noise.

Nepomniachtchi et al. also discloses a system and method for correcting the upside-down orientation of a check within an image that relies on comparing MICR confidence from the original image with MICR confidence from a 180 degree rotated image. Relying on comparing MICR confidence readings limits the speed of the algorithm when implementing the method on a server with multi-threading/multi-processors. The approach in Nepomniachtchi et al. does not address cases where MICR confidence of both images is too low to be acceptable for subsequent processing.

Nepomniachtchi et al. also discloses a system and method for correcting the size of an image using the width of MICR characters. Using width of MICR characters may produce inaccurate size transformations since geometric correction can distort the shape of the MICR characters. Nepomniachtchi et al. also relies on the aspect ratio of the geometrically corrected image which may also be slightly distorted. It can also be difficult to discern the width of certain MICR characters compared to others. Nepomniachtchi et al. also does not scale the document to correspond to known or expected document or check dimensions.

SUMMARY OF THE INVENTION

Accordingly, improved systems for processing images captured by a mobile device are provided. The following descriptions are various embodiments (or aspects) that are encompassed by the invention discussed herein.

According to a first aspect, a system is provided for image capture and processing of financial documents from a mobile device. The mobile device includes an image capture device that is configure to capture a color image of a financial document. The mobile device also includes a processor that is configured to generate a color reduced image and a transmitter that transmits the color reduced image to a server. In some aspects, the color reduced image is a gray-scale image. The server receives the color reduced image from the mobile device and detects the financial document in the color reduced image, geometrically corrects the color reduced image, binarizes the color reduced image to produce a bi-tonal image, and corrects the orientation and size of the bi-tonal image. In some aspects, the server also corrects the orientation and size of the color reduced image.

According to another aspect, the server is further configured to binarize the geometrically corrected image to produce a bi-tonal image. The server chooses a pixel on the gray-scale image, determines whether the chosen pixel is located within a document field, and if the chosen pixel is within a document field, then a window is selected within the document field and an average value and standard deviation are computed for the chosen pixel over the selected window. If the standard deviation is too small the pixel is converted to white, and if the standard deviation is not too small, then converting the chosen pixel to black or white based on the intensity. The process is repeated until there are no more pixels to choose. In another aspect, a threshold is selected for the document field and the determining operation uses the threshold to determine if the standard deviation is too small. In an aspect where the document is a check, the document field may be any one of the: MICR line, courtesy amount, legal amount, date, signature and payee.

According to another aspect, correcting the orientation of the captured image comprises correcting the orientation of the document within the image if the document is in upside-down orientation. In some aspects, correcting the orientation of the captured image further comprises determining the orientation of the document within the image using a relevant object of a known position on the document. In some aspects, the server is further configured to correct the orientation of the bi-tonal image by reading a MICR line on the bottom of the financial document, generating a MICR confidence value for the MICR line as read, comparing the MICR confidence value to a threshold, when the MICR confidence value exceeds the threshold, determining that the bi-tonal image is right-side up, and when the MICR confidence value does not exceed the threshold: determining that the bi-tonal image is not right side up, rotating the image 180 degrees, re-reading the MICR line, generating a new MICR confidence value, comparing the new MICR confidence value to the threshold, when the new MICR confidence value exceeds the threshold, determining that the rotated, bi-tonal image is right side up. In another aspect if neither MICR confidence value exceeds the threshold then the server is further configured to indicate that the orientation of the image is unknown.

According to another aspect, where the financial document in the image is a check, the server is further configured to correct the size of the bi-tonal image using the MICR line. In one aspect the average height of the MICR characters is used to determine a scaling factor that is used to compute the dimensions of the image. In another aspect, the scaling factor is determined using the distance relative to MICR symbols, such as the distance between transit symbols in one aspect, or the distance between a transit symbol and the leading edge of the check in a second aspect. In another aspect, both the height and width of the MICR character are used to determine height and width scaling factors that are used to compute the dimensions of the image. In another aspect, the computed dimensions are compared to expected dimensions in order to adjust the scaling of the image. The expected dimensions may use known check dimensions or dimensions that are based on document dimensions having ⅛th inch multiples.

Other features and advantages should become apparent from the following description, taken in conjunction with the accompanying drawings which illustrate various embodiments.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which:

FIG. 8 is a diagram illustrating an example bi-tonal image of the check of FIGS. 1 and 3 in accordance with the systems and methods described herein;

FIG. 9 is a diagram illustrating an example bi-tonal image of the payment coupon of FIGS. 2 and 4 in accordance with the systems and methods described herein;

DETAILED DESCRIPTION OF VARIOUS EMBODIMENTS

Figure 1:
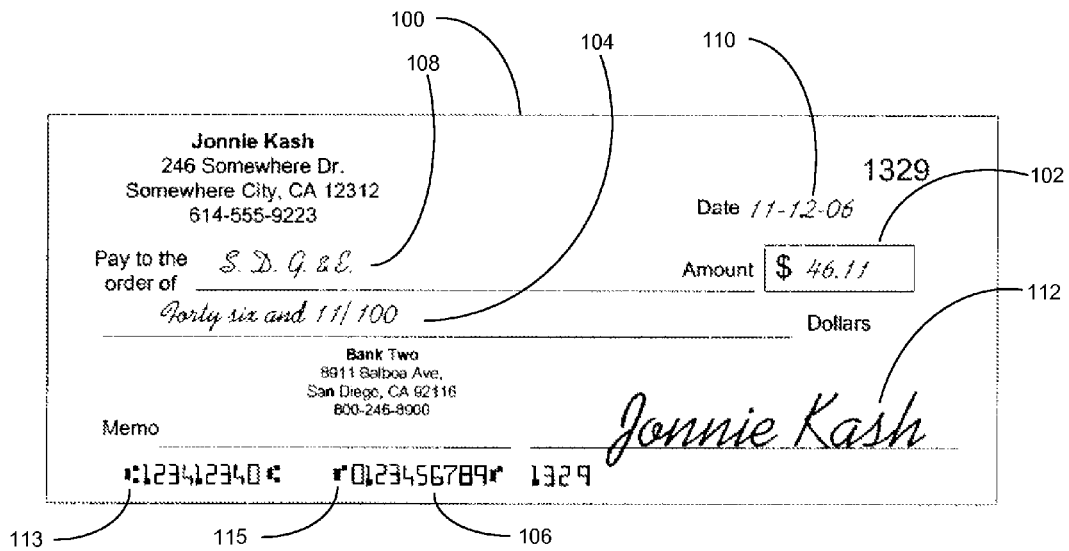
FIG. 1 is a diagram illustrating an example check that might be imaged with the systems and methods described herein.

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The embodiments of the systems, devices and methods described herein may be implemented in hardware or software, or a combination of both. Some of the embodiments described herein may be implemented in computer programs executing on programmable computers, each computer comprising at least one processor, a computer memory (including volatile and non-volatile memory), at least one input device, and at least one output device. For example, and without limitation, the programmable computers may be a server class computer having multiple processors and at least one network interface card. Program code may operate on input data to perform the functions described herein and generate output data.

The present invention is directed towards automated document processing and systems and methods for document image processing using mobile devices. Generally, some embodiments of the invention capture an original color image of a document using a mobile device and then convert the color image to a bi-tonal image. More specifically, some embodiments accept an image of a document captured by a mobile device and convert it into a bi-tonal image of the document that is substantially equivalent in its resolution, size, and quality to document images produced by "standard" scanners.

Before describing the invention in greater detail, it would be useful to define some of the common terms used herein when describing various embodiments of the invention.

The term "standard scanners" includes, but is not limited to, transport scanners, flat-bed scanners, and specialized check-scanners. Some manufacturers of transport scanners include UNISYS®, BancTec®, IBM®, and Canon®. With respect to specialized check-scanners, some models include the TellerScan® TS200 and the Panini® My Vision X. Generally, standard scanners have the ability to scan and produce high quality images, support resolutions from 200 dots per inch to 300 dots per inch (DPI), produce gray-scale and bi-tonal images, and crop an image of a check from a larger full-page size image. Standard scanners for other types of documents may have similar capabilities with even higher resolutions and higher color-depth.

The term "color images" includes, but is not limited to, images having a color depth of 24 bits per a pixel (24 bit/pixel), thereby providing each pixel with one of 16 million possible colors. Each color image is represented by pixels and the dimensions W (width in pixels) and H (height in pixels). An intensity function I maps each pixel in the [W×H] area to its RGB-value. The RGB-value is a triple (R,G,B) that determines the color the pixel represents. Within the triple, each of the R (Red), G (Green) and B (Blue) values are integers between 0 and 255 that determine each respective color's intensity for the pixel.

The term "gray-scale images" includes, but is not limited to, images having a 8 bits per a pixel (8 bit/pixel) that provides one of 256 shades of gray. As a person of ordinary skill in the art would appreciate, gray-scale images also include images with color depths of other various bit levels (e.g. 4 bit/pixel or 2 bit/pixel) representing fewer shades of gray. Each gray-scale image is represented by pixels and the dimensions W (width in pixels) and H (height in pixels). An intensity function I maps each pixel in the [W×H] area onto a range of gray shades. More specifically, each pixel has a value between 0 and 255 which determines that pixel's shade of gray.

Bi-tonal images are similar to gray-scale images in that they are represented by pixels and the dimensions W (width in pixels) and H (height in pixels). However, each pixel within a bi-tonal image has one of two colors: black or white. Accordingly, a bi-tonal image has a color depth of 1 bit per a pixel (1 bit/pixel) representing either black or white. The similarity transformation is based off the assumption that there are two images of [W×H] and [W'×H'] dimensions, respectively, and that the dimensions are proportional (i.e. W/W'=H/H'). The term "similarity transformation" may refer to a transformation ST from [W×H] area onto [W'×H'] area such that ST maps pixel p=p(x,y) on pixel p'=p'(x',y') with x'=x*W'/W and y=y*H'/H.

Figure 2:
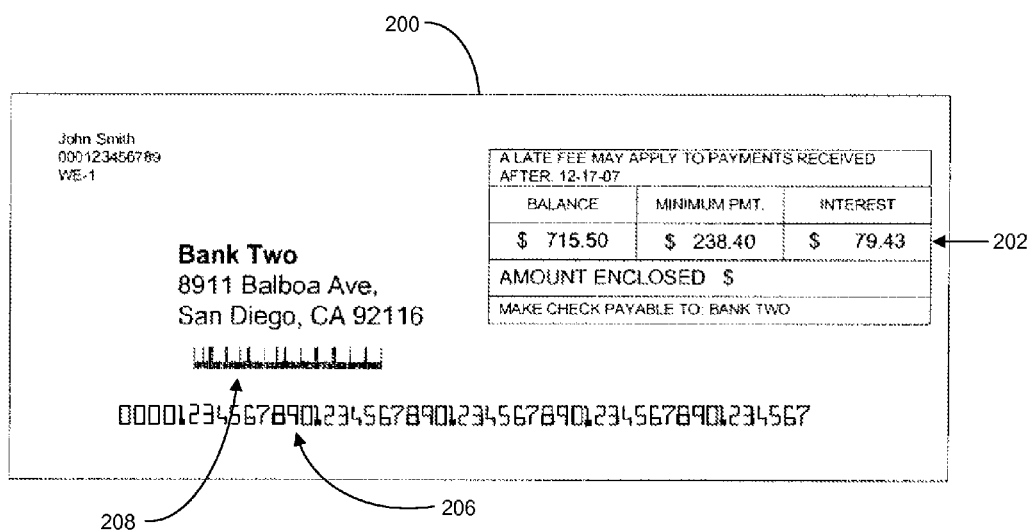
FIG. 2 is a diagram illustrating an example payment coupon that might be imaged using the systems and methods described herein.

FIG. 1 is a diagram illustrating an example check 100 that might be imaged with the systems and methods described herein. The mobile image capture and processing systems and methods may be used with a variety of documents, including financial documents such as personal checks, business checks, cashier's checks, certified checks, and warrants. By using an image of the check 100, the check clearing process is performed more efficiently. As would be appreciated by those of skill in the art, checks are not the only type of documents that may be used with these systems. For example, other documents, such as deposit slips, might also be processed using the systems and methods described herein. FIG. 2 is a diagram illustrating an example payment coupon 200 that might be imaged using the systems and methods described herein.

In some embodiments, checks 100, payment coupons 200, or other documents might be imaged using a mobile device. The mobile device may be a mobile telephone handset, Personal Digital Assistant, or other mobile communication device. The mobile device may include a camera, or might include functionality that allows it to connect to a camera. This connection might be wired or wireless. In this way the mobile device may connect to an external camera and receive images from the camera.

Images of the documents taken using the mobile device or downloaded to the mobile device may be transmitted to a server. For example, in some cases, the images may be transmitted over a mobile communication device network, such as a code division multiple access ("CDMA") telephone network, or other mobile telephone network. Images taken using, for example, a mobile device's camera, may be initially formatted as 24 bit per pixel (24 bit/pixel) JPEG images. It will be understood, however, that many other types of images might also be taken using different cameras, mobile devices, etc.

Various documents may include various fields. Some of the fields in the documents might be considered "primary" fields. For example, the primary fields of interest on a check 100 might include the courtesy amount 102, legal amount 104 and the MICR line 106. The MICR line 106 may include symbols that delimit fields within the MICR line, such as, for example, transit symbol 113 indicating the transit and the on-us symbol 115 indicating the account number. Other fields of interest may include the payee 108, date 110 and the signature 112. The primary fields of interest for the payment coupon 200 might include the payment amounts 202, such as the balance, minimum payment and interest. The billing company name and address 204, the account number 206 and the code-line 208 may also be fields of interest. In some embodiments it may be necessary to electronically read various information from these fields on a document. For example, in order to process a check that is to be deposited, it might be necessary to electronically read the legal 104 and courtesy 102 amounts, the MICR line 106, the payee 108, date 110 and the signature 112 on the check. In some cases, this information is difficult to read because, for example, the check or other document is out of focus or is otherwise poorly imaged.

Figure 3:
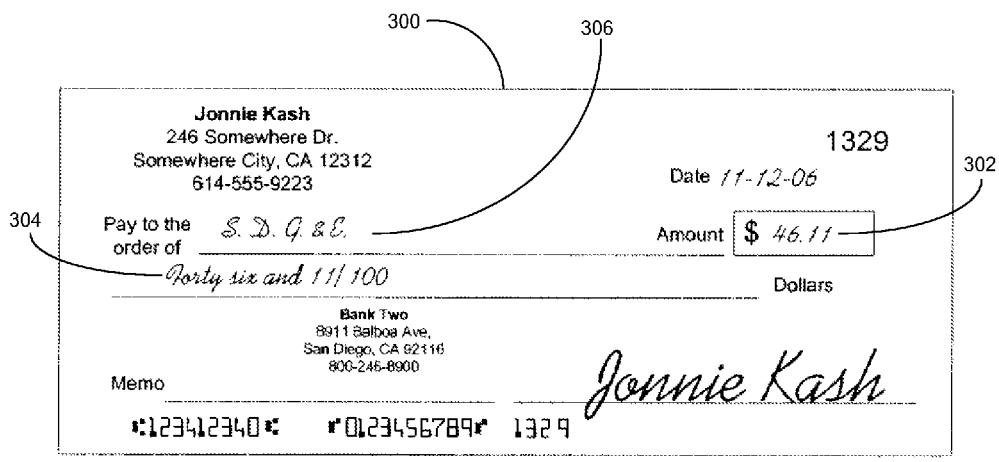
FIG. 3 is a diagram illustrating an example out-of-focus image of the check illustrated in FIG. 1.
Figure 4:
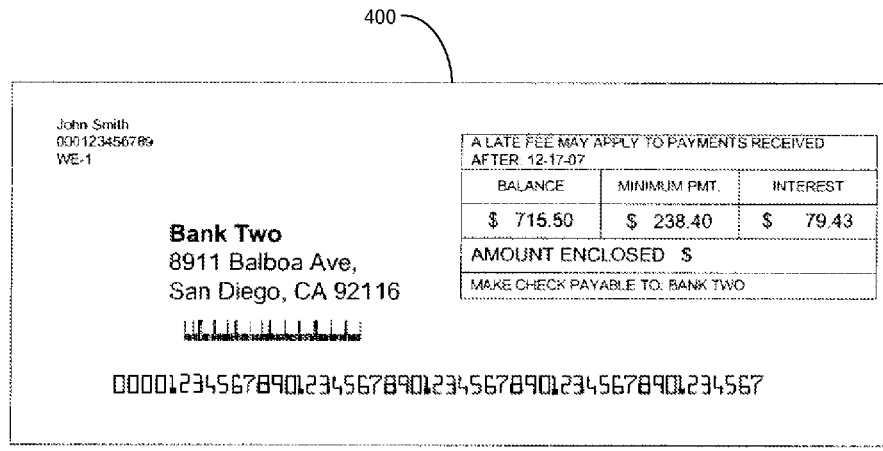
FIG. 4 is a diagram illustrating an example out-of-focus image of the payment coupon illustrated in FIG. 2.

FIG. 3 is a diagram illustrating an example out-of-focus image of the check illustrated in FIG. 1. In some cases, document images might be out of focus. An image of a document that is out of focus may be difficult or impossible to read, electronically process, etc. For example, it might be difficult to read the amounts 302 and 304 or the payee 306 on the image 300 of the check 100. FIG. 4 is a diagram illustrating an example out-of-focus image of the payment coupon illustrated in FIG. 2. Because the image 400 of the payment coupon 200 is out of focus it might be difficult to properly credit the payment. For example, the payment might be credited to the wrong account or an incorrect amount might be credited. This may be especially true if a check and a payment coupon are both difficult to read or the scan quality is poor.

Many different factors may affect the quality of an image and the ability of a mobile device based image capture and processing system. Optical defects, such as out-of-focus images (as discussed above), unequal contrast or brightness, or other optical defects, might make it difficult to process an image of a document (e.g., a check, payment coupon, deposit slip, etc.). The quality of an image may also be affected by the document position on a surface when photographed or the angle at which the document was photographed. This affects the image quality by causing the document to appear, for example, right side up, upside down, skewed, etc. Further, if a document is imaged while upside-down it might be impossible or nearly impossible to for the system to determine the information contained on the document.

In some cases, the type of surface might affect the final image. For example, if a document is sitting on a rough surface when an image is taken, that rough surface might show through. In some cases the surface of the document might be rough because of the surface below it. Additionally, the rough surface may cause shadows or other problems that might be picked up by the camera. These problems might make it difficult or impossible to read the information contained on the document.

Lighting may also affect the quality of an image, for example, the location of a light source and light source distortions. Using a light source above a document might light the document in a way that improves the image quality, while a light source to the side of the document might produce an image that is more difficult to process. Lighting from the side might, for example, cause shadows or other lighting distortions. The type of light might also be a factor, for example, sun, electric bulb, florescent lighting, etc. If the lighting is too bright, the document might be washed out in the image. On the other hand, if the lighting is too dark, it might be difficult to read the image.

The quality of the image might also be affected by document features, such as, the type of document, the fonts used, the colors selected, etc. For example, an image of a white document with black lettering may be easier to process than a dark colored document with black letters. Image quality may also be affected by the mobile device used. Some mobile camera phones, for example, might have cameras that save an image using a greater number of mega pixels. Other mobile cameras phones might have an auto-focus feature, automatic flash, etc. Generally, these features may improve an image when compared to mobile devices that do not include such features.

A document image taken using a mobile device might have one or more of the defects discussed above. These defects or others may cause low accuracy when processing the image, for example, when processing one or more of the fields on a document. Accordingly, in some embodiments, systems and methods using a mobile device to create images of documents may include the ability to identify poor quality images. If the quality of an image is determined to be poor, a user may be prompted to take another image.

A variety of metrics might be used to detect an out-of-focus image. For example, a focus measure may be employed. The focus measure may be the ratio of the maximum video gradient between adjacent pixels measured over the entire image and normalized with respect to an image's gray level dynamic range and "pixel pitch". The pixel pitch may be the distance between dots on the image. In some embodiments a focus score might be used to determine if an image is adequately focused. If an image is not adequately focused, a user might be prompted to take another image.

An image focus score might be calculated as a function of maximum video gradient, gray level dynamic range and pixel pitch. For example, in one embodiment:

$$\text{Image Focus Score} = (\text{Maximum Video Gradient}) * (\text{Gray Level Dynamic Range}) * (\text{Pixel Pitch}) \quad \text{(eq. 1)}$$

The video gradient may be the absolute value of the gray level for a first pixel "i" minus the gray level for a second pixel "i+1". For example:

$$\text{Video Gradient} = ABS[(\text{Grey level for pixel } ``i") - (\text{Gray level for pixel } ``i+1")] \quad \text{(eq. 2)}$$

The gray level dynamic range may be the average of the "n" lightest pixels minus the average of the "n" darkest pixels. For example:

$$\text{Gray Level Dynamic Range} = [\text{AVE}(``N" \text{ lightest pixels}) - \text{AVE}(``N" \text{ darkest pixels})] \quad \text{(eq. 3)}$$

In equation 3 above, N may be defined as the number of pixels used to determine the average darkest and lightest pixel gray levels in the image. In some embodiments, N might be chosen to be 64. Accordingly, in some embodiments, the 64 darkest pixels are averaged together and the 64 lightest pixels are averaged together to compute the gray level dynamic range value.

The pixel pitch may be the reciprocal of the image resolution, for example, in dots per inch.

Pixel Pitch=[1/Image Resolution] (eq. 4)

In other words, as defined above, the pixel pitch is the distance between dots on the image because the Image Resolution is the reciprocal of the distance between dots on an image.

Figure 5:
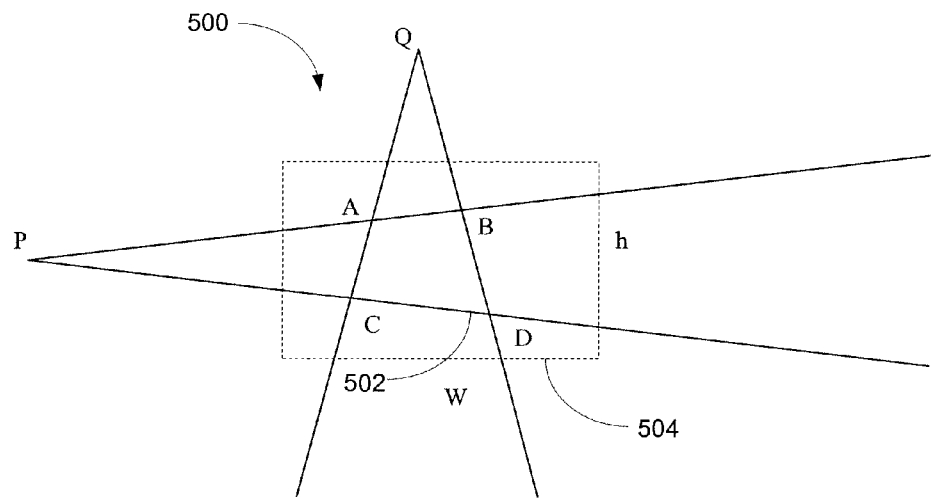
FIG. 5 is a diagram illustrating an example of perspective distortion in an image of a rectangular shaped document.

FIG. 5 is a diagram illustrating an example of perspective distortion in an image of a rectangular shaped document. An image may contain perspective transformation distortions 500 such that a rectangle might become a quadrangle ABCD 502, as illustrated in the figure. The perspective distortion may occur because an image is taken using a camera that is placed at an angle to a document rather than directly above the document. When directly above a rectangular document it will generally appear to be rectangular. As the imaging device moves from directly above the surface, the document distorts until it can no longer be seen and only the edge of the page may be seen.

The dotted frame 504 comprises the image frame obtained by the camera. The image frame is sized h×w, as illustrated in the figure. Generally, it may be preferable to contain an entire document within the h×w frame of a single image. It will be understood, however, that some documents might be too large or include too many pages for this to be preferable or even feasible.

In some embodiments, an image might be processed, or preprocessed, to automatically find and "lift" the quadrangle 502. In other words, the document that forms quadrangle 502 might be separated from the rest of the image so that the document alone might be processed. By separating quadrangle 502 from any background in an image, it may then be further processed.

The quadrangle 502 might be mapped onto a rectangular bitmap in order to remove or decrease the perspective distortion. Additionally, image sharpening might be used to improve the out-of-focus score of the image. The resolution of the image may then be increased and the image converted to a black-and-white image. In some cases, a black-and-white image might have a higher recognition rate when processed using an automated document processing system in accordance with the systems and methods described herein.

An image that is bi-tonal, e.g., black-and-white, might be used in some systems. Such systems might require an image that is at least 200 dots per inch resolution. Accordingly, a color image taken using a mobile device might need to be high enough quality so that the image may successfully be converted from, for example, a 24 bit per pixel (24 bit/pixel) RGB image to a bi-tonal image. The image may be sized as if the document, e.g., check, payment coupon, etc., was scanned at 200 dots per inch.

Figure 6:
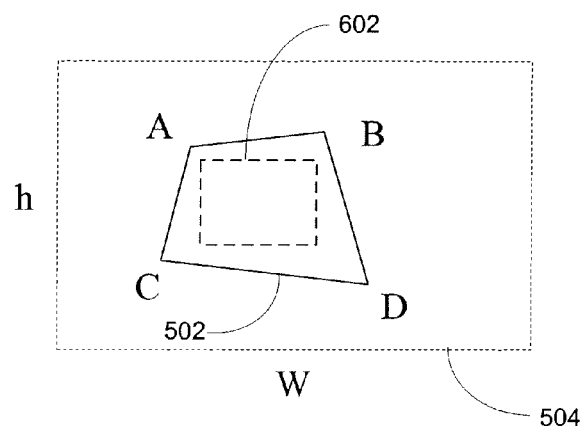
FIG. 6 is a diagram illustrating an example original image, focus rectangle and document quadrangle ABCD in accordance with the example of FIG. 5.

FIG. 6 is a diagram illustrating an example original image, focus rectangle and document quadrangle ABCD in accordance with the example of FIG. 5. In some embodiments it may be necessary to place a document for processing at or near the center of an input image close to the camera. All points A, B, C and D are located in the image, and the focus rectangle 602 is located inside quadrangle ABCD 502. The document might also have a low out-of-focus score and the background surrounding the document might be selected to be darker than the document. In this way, the lighter document will stand out from the darker background.

Figure 7:
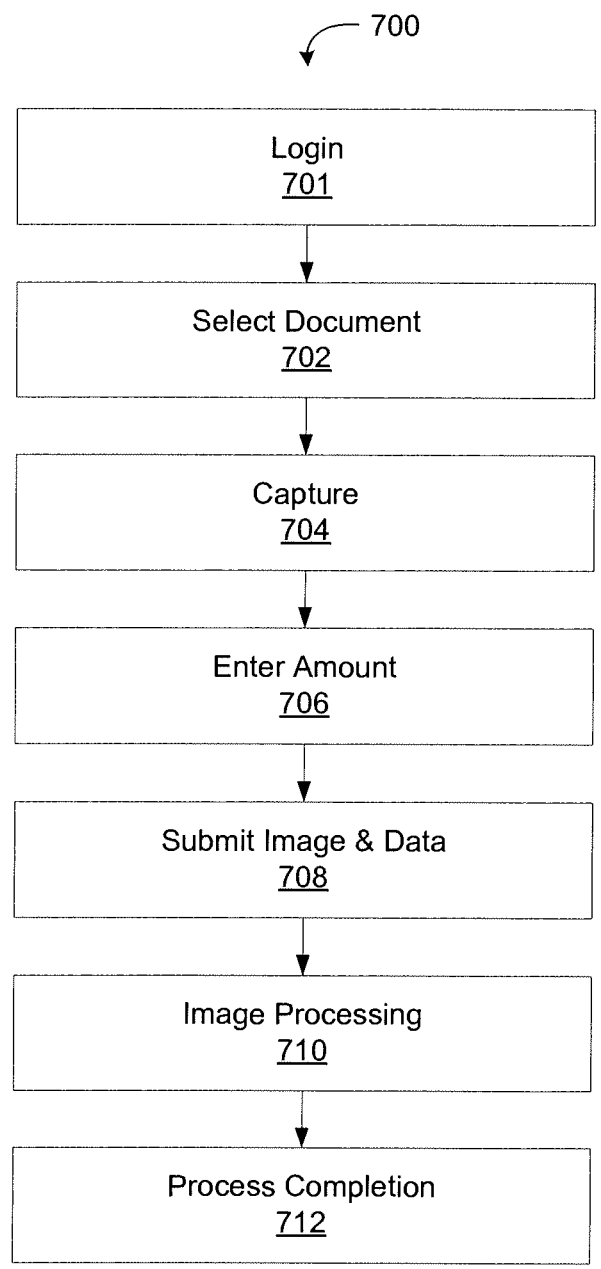
FIG. 7 is a flowchart illustrating an example method in accordance with the systems and methods described herein.

FIG. 7 is a flowchart illustrating an example method 700 in accordance with the systems and methods described herein. Referring now to FIG. 7, in operation 701 a user logs into a document capture system on a mobile communication device. In accordance with various embodiments, methods and systems for document capture on a mobile communication device may further comprise requiring the user to log into an application. In this way, access to the document capture system using a mobile communication device might be limited to authorized users.

In operation 702, in the illustrated embodiment, the type of document is selected. For example, a user might select a document type for a check, payment coupon or deposit slip. By entering the type of document, a mobile device might be able to scan specific parts of an image to determine, for example, payee, check amount, signature, etc. In some embodiments, however, a device might determine what type of document is being imaged by processing the image.

In operation 704, an image is captured using, for example, a mobile communication device. In the illustrated embodiment an application running on the mobile communication device may prompt the user of the device to take a picture of the front of the document. The back of the document might also be imaged. For example, if the document is a check, an image of the back of the document might be necessary because the back of the check might need to be endorsed. If the back of the document needs to be imaged, the application may prompt the user to take the image. The application might also conduct some image processing to determine if the quality of the image or images is sufficient for further processing in accordance with the systems and methods described herein. The quality needed for further processing might vary from implementation to implementation. For example, some systems might be better able to determine information contained on a poor quality image than other systems.

In the illustrated embodiment, at operation 706, an amount is entered. When the document being processed is a check, the amount entered may be the amount of the check. Alternatively, the amount might be an amount of a payment or an amount of a deposit, depending on the type of document being processed.

In some embodiments, the system might determine the amount by processing the image. For example, in some cases, optical character recognition ("OCR") might be used to determine what characters and numbers are present on the document. For example, numbers located in the amount box of a check or payment coupon might then be determined using OCR or other computer based character determination. This might be done instead of requiring the amount to be entered manually. In other embodiments, a manual entry might be used to verify a computer generated value that is determined using, for example, OCR or other computer based character determination.

In operation 708, the image is transmitted to a server. The image might be transmitted from the mobile communication device that captured the image of the document (e.g. camera phone) using, for example, hypertext transfer protocol ("HTTP") or mobile messaging service ("MMS"). The server might then confirm that the image was received by, for example, transmitting a message back to the mobile device.

In operation 710, image processing is performed. In the example embodiment, the server may clean up the image by performing auto-rotate, de-skew, perspective distortion correction, cropping, etc. The server might also process the image to produce a bi-tonal image for data extraction.

In other embodiments, some or all data processing might be performed at the mobile communication device. For example, the mobile communication device might perform auto-rotate, de-skew, perspective distortion correction, cropping, etc. Additionally, the mobile device might also process the image to produce a bi-tonal image for data extraction. In some cases, the processing might be shared between the mobile device and the server.

In operation 712, the processing of the document using a mobile device is completed. For example, when the server has confirmed that all necessary data can be extracted from a received image, it might transmit a status message to the mobile device that transmitted the image. Alternatively, if some necessary data cannot be extracted, the server may transmit a request for additional data. This request might include a request for an additional image. In some cases, the request may be for data entered by a user, for example, an amount, e.g., of a check, that might be entered using a key pad on the mobile communication device.

In some embodiments, the quality of the image is determined at the mobile device. In this way the number of requests from the server for additional images might be reduced. The request may come directly from the mobile device. This may allow for the request to be more quickly determined and may allow a user to take an additional image within a shorter time from the earlier image. This may mean, for example, that the user is still physically close to the document and is still holding the communication device. This might make it easier to retake an image. If the image quality processing occurs at a server it might take longer to determine that the image quality is acceptable and communicate that information back to a user. This may mean the user is no longer near the document or has started performing another task. It will be understood, however, that in some embodiments, a server based implementation might be employed to off-load processing demands from the mobile device. Additionally, in some cases it might be quick as or quicker than a system that uses the mobile communication device to process an image to determine image quality.

FIG. 8 is a diagram illustrating an example bi-tonal image 800 of the check of FIGS. 1 and 3 in accordance with the systems and methods described herein. FIG. 9 is a diagram illustrating an example bi-tonal image 900 of the payment coupon of FIGS. 2 and 4 in accordance with the systems and methods described herein. As illustrated, in the bi-tonal images of FIGS. 8 and 9, the necessary information (such as payees, amounts, account number, etc.) has been preserved, while extra information has been removed. For example, background patterns that some people might have on there checks are not present in the bi-tonal image 800 of the check.

Figure 10:
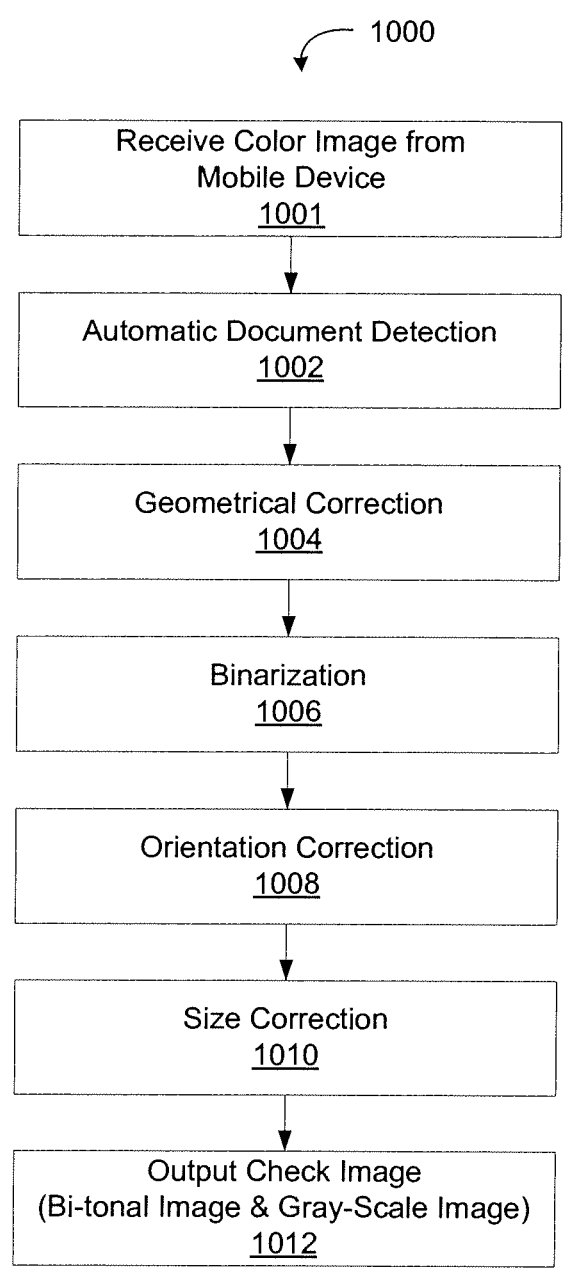
FIG. 10 is a flowchart of an example method that is used during image processing stages in accordance with the systems and methods described herein.

FIG. 10 is a flowchart of an example method 1000 that is used during image processing stages. In particular, some or all of the operations illustrated in FIG. 10 can be performed during various operations illustrated in FIG. 7. Referring now to FIG. 10, at operation 1001 the method 700 receives a color image originally taken by the mobile device (also referred to as the "mobile image"). For example, the image might originate from a camera phone which has now transmitted the image to a server for post-capture processing. This mobile image has a document located somewhere within the image. In order to detect the document, an automatic document detection module at operation 1002. Depending on the embodiment, the automatic document detection module may be specialized in detecting only certain types of documents such as financial documents (e.g. checks or deposit coupons), or may be general in detecting a variety of types of transactional documents. At the conclusion of the automatic document detection operation, the positions of the document corners are outputted (e.g. check corners) as corners A, B, C and D of quadrangle ABCD (e.g. quadrangle ABCD 502). Further details in regards to the automatic document detection operation will be provided with respect to FIG. 11A.

Following the automatic document detection, method 1000 performs geometrical corrections to the mobile image at operation 1004. As previously noted, this can comprise cleaning up the image by performing auto-rotate operations, de-skew operations, perspective distortion correction operations, and cropping operations. Generally, this is due to perspective distortions present in the original mobile image, as well as the possibility of incorrect orientation of the document within the mobile image. The discussion of FIG. 15a will provide further detail with respect to the geometrical correction operation.

Next follows the binarization of the image at operation 1006. Binarization of the image is also referred to as generating a bi-tonal image of the document at 1 bit per pixel. Binarization of the image is usually required by the Remote Deposit Systems for processing. This binarization operation will be discussed in further detail with respect to FIGS. 16a and 16c.

A size correction operation 1010 may be employed since many processing engines are sensitive to the image size. For example, in the context of checks, the processing engine for amount recognition may rely on the check size to distinguish personal checks from business checks, whereas the processing engine for form identification may rely on document size as an important characteristic in determining the form type. Size correction operation 1010 will be discussed in greater detail with respect to FIG. 18.

Method 1000 concludes by outputting the document as a bi-tonal image and a gray-scale image at operation 1012. These images are subsequently utilized in processing (e.g. financial processing), depending on the type of document represented in the image. Usually, this financial processing is performed during the process completion described with respect with operation 712 of FIG. 7. The bi-tonal image is an image that is recognition-friendly by financial processing systems.

Continuing with reference to the automatic document detection operation previously described with respect to operation 1002 of FIG. 10, FIGS. 11-14 illustrate the operations of automatic document detection with greater specificity.

Figure 11A:
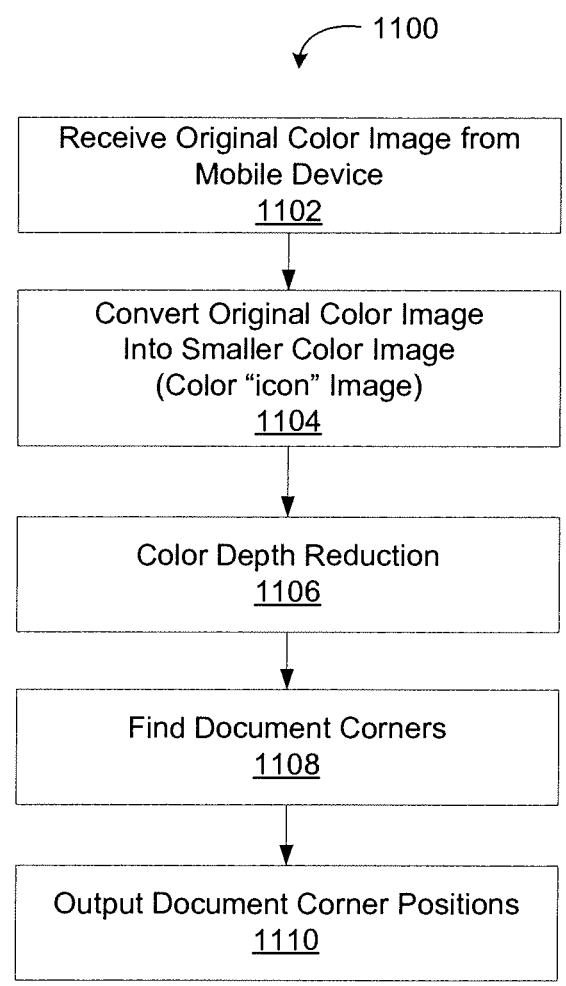
FIG. 11*a* is a flowchart illustrating a known method for automatic document detection within a color image from a mobile device in accordance with the systems and methods described herein.

Referring now to FIG. 11a, a flowchart is provided illustrating a known method 1100 for automatic document detection within a color image from a mobile device. Typically, the operations described within method 1100 are performed within an automatic document detection module, however, embodiments exist where the operations reside amongst multiple modules. In addition, generally the automatic document detection module takes a variety of factors into consideration when detecting the document in the mobile image. The automatic document detection module can take into consideration arbitrary location of the document within the mobile image, the 3-D distortions within the mobile image, the unknown size of the document, the unknown color of the document, the unknown color(s) of the background, and various other characteristics of the mobile engine (e.g. resolution, dimensions, etc.).

Method 1100 begins at operation 1102 by receiving the original color image from the mobile device. Upon receipt, this original color image is converted into a smaller color image, also referred to as a color "icon" image, at operation 1104. This color "icon" image preserves the color contrasts between the document and the background, while suppressing contrasts inside the document. A detailed description of the conversion process is provided with respect to FIG. 12a.

A color reduction operation is then applied to the color "icon" image at operation 1106. During the operation, the overall color of the image is reduced, while the contrast between the document and its background is preserved within the image. Specifically, the color "icon" image of operation 1104 is converted into a gray "icon" image (also known as a gray-scale "icon" image) having the same size. The color depth reduction process is described with further detail with respect to FIG. 13a.

Figure 11B:
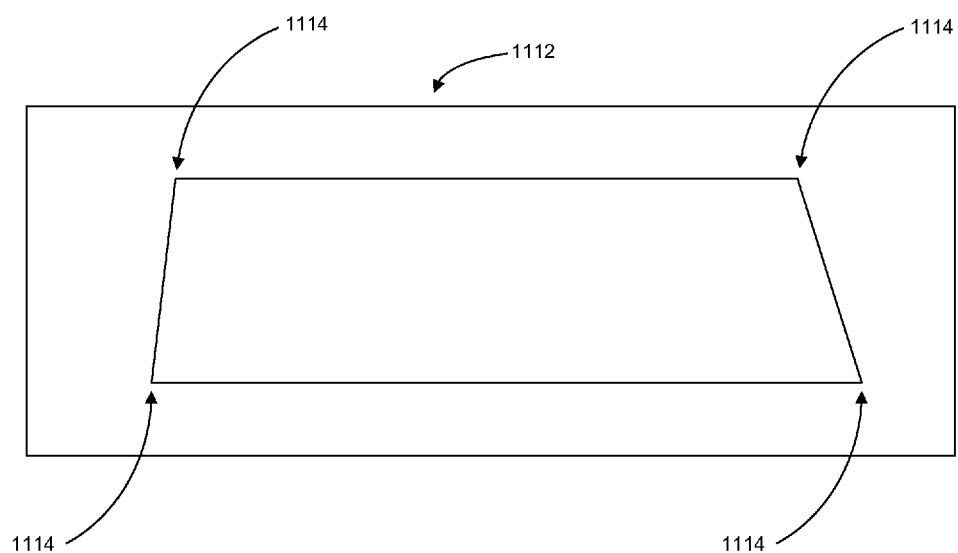
FIG. 11*b* is an example mobile image depicting a check where the corners have been detected in accordance with the systems and methods described herein.

Subsequently, method 1100 locates the corners of the document within the gray "icon" image at operation 1108. As previously noted in FIG. 6, these corners A, B, C, and D make up the quadrangle ABCD (e.g. quadrangle ABCD 502). Quadrangle ABCD, in turn, makes up the perimeter of the document. For example, FIG. 11b depicts a check 1112 in which corners 1114 are detected by operation 1108. Upon detection of the corners, the location of the corners is outputted at operation 1110.

Figure 11C:
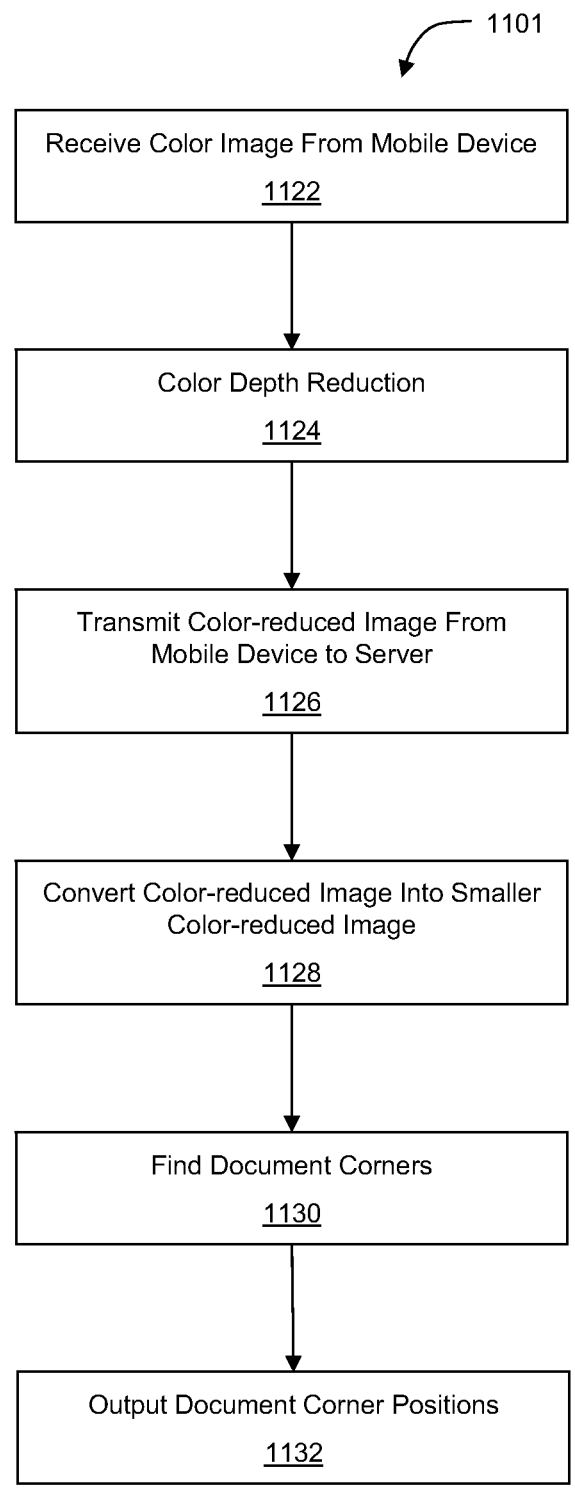
FIG. 11*c* is a flowchart illustrating an improved method for automatic document detection within a gray-scale image from a mobile device in accordance with the systems and methods described herein.

Referring now to FIG. 11c, a flowchart is provided illustrating an improved method 1101 for automatic document detection within an image from a mobile device. Method 1101 provides a faster automatic document detection that includes converting an image to a color reduced image on the mobile device and then transmitting the image to a server to perform the remaining steps of automatic document detection method 1101. Mobile devices are often limited in terms of available processing power and transmission bandwidth. If method 1100 of FIG. 11a were performed entirely on the mobile device, automatic document detection would take a substantial time on the device and occupy processor cycles of the mobile device that could be used for other tasks. Sending a color image from the mobile device to the server would also take substantial transmission time and use valuable bandwidth. It's much faster to convert to a color reduced image and transmit the color reduced image than transmitting a full color image or performing image processing on the mobile device. Improved method 1101 relies on sending a color reduced image and using a server to perform processor intensive steps of method 1101 to provide the faster image processing and faster image quality feedback from the server. Method 1101 also provides the user with the perception of faster processing since the mobile device is not occupied with the image processing operations or transmitting large amounts of data associated with color images.

Method 1101 begins at operation 1122 by receiving a color image from the mobile device. Upon receipt, a color reduction operation is applied to the color image at operation 1124. During the operation, the overall color of the image is reduced resulting in a color reduced image requiring less storage size. Color reduction may be performed on a pixel-by-pixel basis using the RGB values of each pixel and a preferred weighting. Other color reduction methods may also be used, including that described in FIG. 13a. In some embodiments, color reduced image may be a gray-scale image.

Next, at operation 1126, the color reduced image is transmitted from the mobile device to the server. Since the color depth reduction operation results in an image with a smaller size, transmission time is reduced as compared to sending a color image. Upon receipt at the server, the color reduced image is converted into a smaller color reduced image, that may be referred to as an 'icon' image for convenience, at operation 1128. The conversion process involves down-scaling the color reduced image similar to the process described with respect to FIG. 12a.

Subsequently, method 1101 locates the corners of the document within the "icon" image at operation 1130. As previously noted, the corners make up the quadrangle (e.g. quadrangle ABCD 502) that defines the perimeter of the document. Upon detection of the corners, the location of the corners is outputted at operation 1132. The corner locations may be used by the server to geometrically correct the document within the color reduced image received by the server.

Figure 12A:
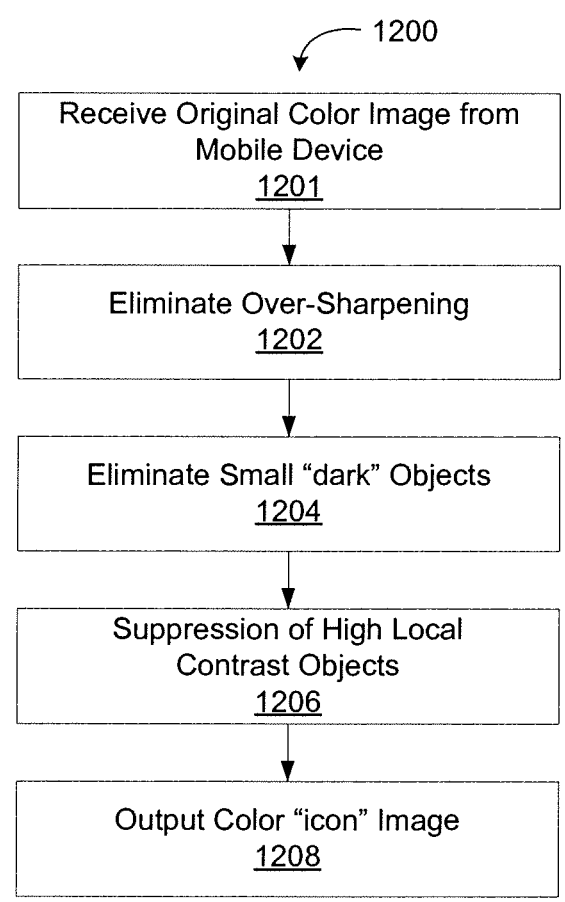
FIG. 12*a* is a flowchart illustrating an example method for converting a color image to a smaller "icon" image in accordance with the systems and methods described herein.

Referring now to FIG. 12a, a flowchart is provided describing an example method 1200 for conversion of a color image to a smaller "icon" image. The smaller "icon" image preserves the color contrasts between the document depicted therein and its background, while suppressing contrasts inside the document. Upon receipt of the original color image from the mobile device at operation 1201, the method 1200 eliminates over-sharpening within the image at operation 1202. Accordingly, assuming the color input image I has the dimensions of W×H pixels, operation 1202 averages the intensity of image I and downscales image I to image I', such that image I' has dimensions that are half that of image I (i.e. W'=W/2 and H'=H/2). Under certain embodiments, the color transformation formula can be described as the following:

$$C(p')=\text{ave}\{C(q):q \text{ in } SXS\text{-window of } p\}, \quad \text{(eq. 5)}$$

where C is any of red, green or blue components of color intensity; p' is any arbitrary pixel on image I' with coordinates (x',y'); p is a corresponding pixel on image I:p=p(x,y), where x=2*x' and y=2*y'; q is any pixel included into SXS-window centered in p; S is established experimentally; and ave is averaging over all q in the SXS-window.

At the next operation 1204, small "dark" objects within the image are eliminated. Examples of such small "dark" objects include, but are not limited to, machine-printed characters and hand-printed characters inside the document. Hence, assuming operation 1204 receives image I' from operation 1202, operation 1204 creates a new color image I" referred to as an "icon" with width W" set to a fixed small value and height H" set to W"*(H/W), thereby preserving the original aspect ratio of image I. In some embodiments, the transformation formula can be described as the following:

$$C(p'')=\max\{C(q'):q' \text{ in } S'XS'\text{-window of } p'\}, \quad \text{(eq. 6)}$$

where C is any of red, green or blue components of color intensity; p" is an arbitrary pixel on image I"; p' is a pixel on image I' which corresponds to p" under similarity transformation, as previously defined; q' is any pixel on image I' included into S'XS'-window centered in p'; max is maximum over all q' in the S'XS'-window; W" is established experimentally; S' is established experimentally for computing the intensity I"; and I"(p") is the intensity value defined by maximizing the intensity function I' (p') within the window of corresponding pixel p' on image I', separately for each color plane. The reason for using the "maximum" rather than "average" is to make the "icon" whiter (white pixels have a RGB-value of (255,255,255)).

Figure 12B:
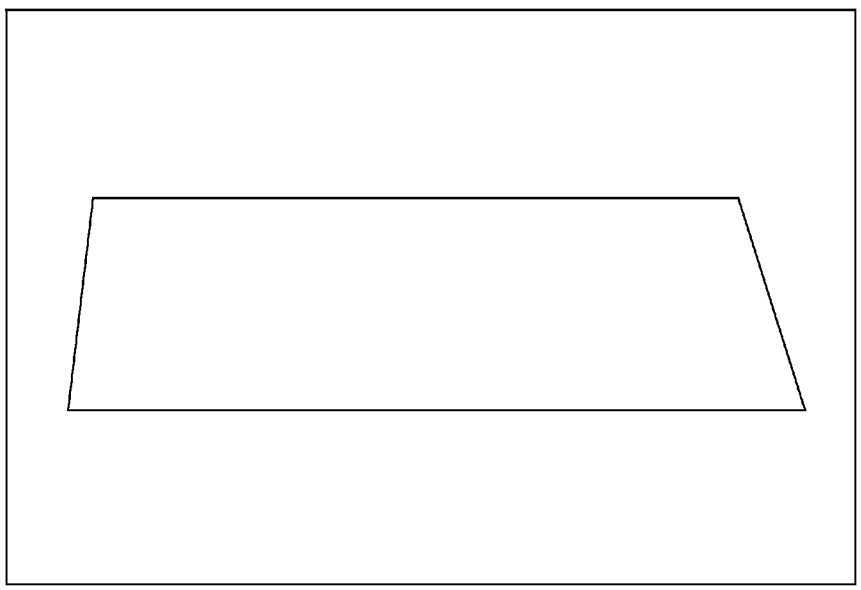
FIG. 12*b* is a mobile image depicting an example of the mobile image of FIG. 11*b* after being converted into a color "icon" image in accordance with the systems and methods described herein.

In the next operation 1206, the high local contrast of "small" objects, such as lines, text, and handwriting on a document, is suppressed, while the other object edges within the "icon" are preserved. Often, these other object edges are bold. Multiple dilation and erosion operations (also known as morphological image transformations) are utilized in the suppression of the high local contrast of "small" objects. Such morphological image transformations are commonly known and used by those of ordinary skill in the art. The sequence and amount of dilation and erosion operations used is determined experimentally. Subsequent to the suppression operation 1206, a color "icon" image is outputted at operation 1208. FIG. 12b depicts an example of the mobile image of FIG. 11b after being converted into a color "icon" image.

Figure 13A:
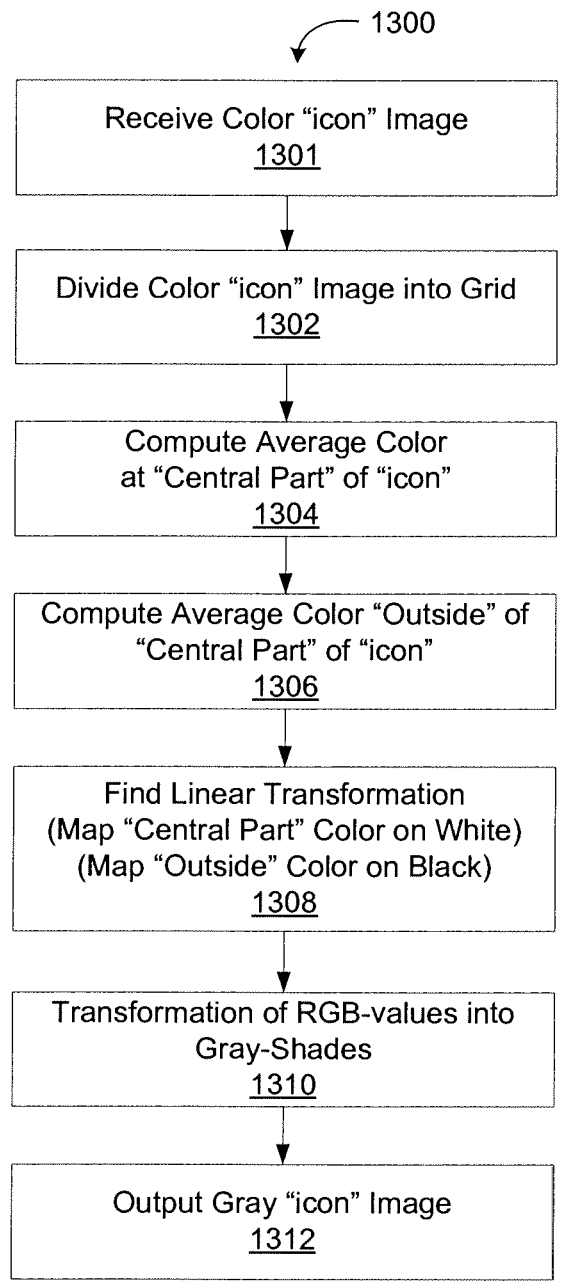
FIG. 13*a* is a flowchart illustrating an example method for color depth reduction in accordance with the systems and methods described herein.
Figure 13B:
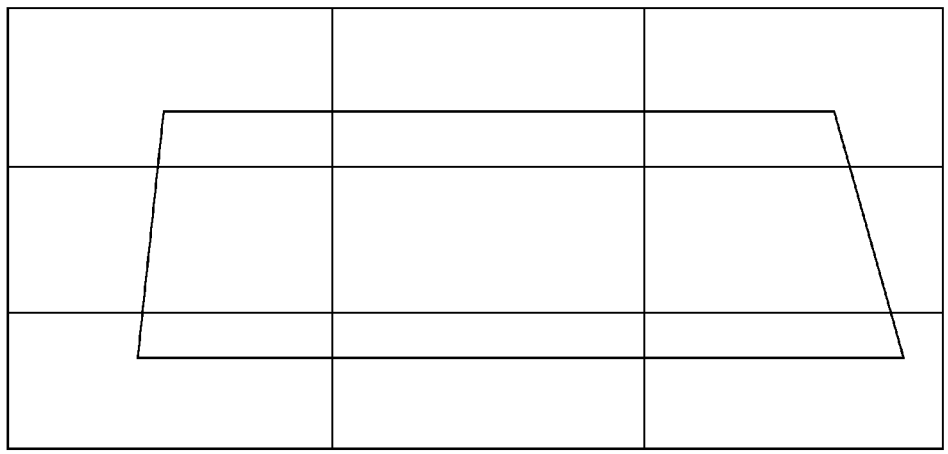
FIG. 13*b* is a mobile image depicting an example of the color "icon" image of FIG. 12*b* after a color depth reduction operation has divided it into a 3×3 grid in accordance with the systems and methods described herein.

Referring now to FIG. 13a, a flowchart is provided illustrating an example method 1300 that provides further details with respect to the color depth reduction operation 1106 as illustrated in FIG. 11a. At operation 1301, the method 1300 receives a color "icon" image for color reduction. The method divides the color "icon" image into a grid (or matrix) of fixed length and width with equal size grid elements at operation 1302. In some embodiments, the preferred grid size is such that there is a center grid element. For example, a grid size of 3×3 may be employed. FIG. 13b depicts an example of the color "icon" image of FIG. 12b after operation 1302 has divided it into a 3×3 grid.

Then, at operation 1304, the "central part" of the icon, which is usually the center most grid element, has its color averaged. Next, the method 1300 computes the average color of the remaining parts of the icon at operation 1306. More specifically, the grid elements "outside" the "central part" of the "icon" have their colors averaged. Usually, in instances where there is a central grid element (e.g. 3×3 grid), the "outside" of the "central part" comprises all the grid elements other than the central grid element.

Figure 13C:
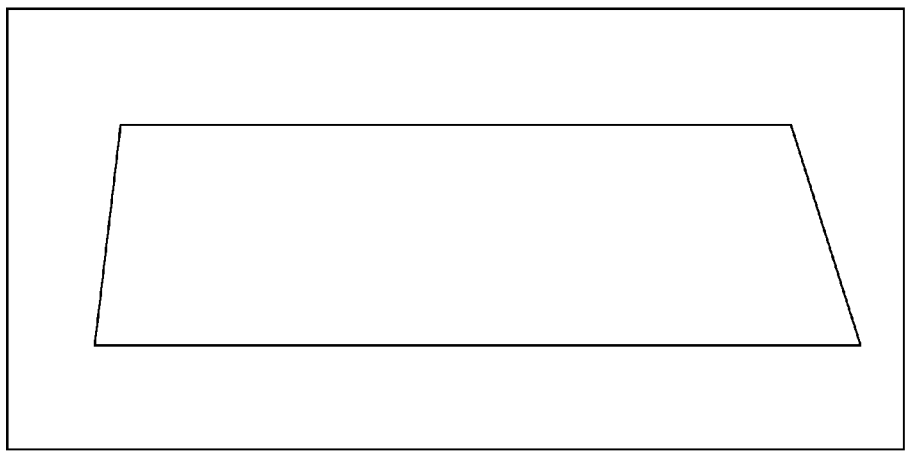
FIG. 13*c* is a mobile image depicting an example of the of the color "icon" image of FIG. 12*b* once it has been converted to a gray "icon" image by a color depth reduction operation in accordance with the systems and methods described herein.

Subsequently, method 1300 determines a linear transformation for the RGB-space at operation 1308. The linear transformation is defined such that it maps the average color of the "central part" computed during operation 1304 to white (i.e. 255), while the average color of the "outside" computed during operation 1306 maps to black (i.e. 0). All remaining colors are linearly mapped to a shade of gray. This linear transformation, once determined, is used at operation 1310 to transform all RGB-values from the color "icon" to a gray scale "icon" image, which is then outputted at operation 1312. Within particular embodiments, the resulting gray "icon" image (also referred to as a gray-scale "icon" image) maximizes the contrast between the document background (assuming that the document is located close to the center of the image) and the background. FIG. 13c depicts an example of the color "icon" image of FIG. 12b once it has been converted to a gray "icon" image.

Figure 14:
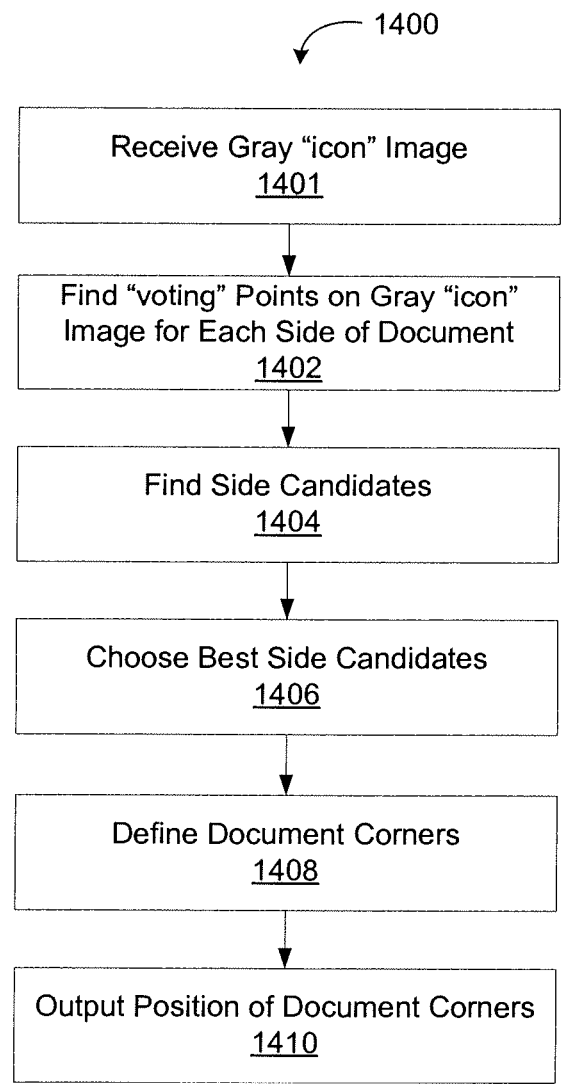
FIG. 14 is a flowchart illustrating an example method for finding document corners from a gray "icon" image in accordance with the systems and methods described herein.

Referring now to FIG. 14, a flowchart is provided illustrating an example method 1400 for finding document corners from a gray "icon" image containing a document. Upon receiving a gray "icon" image at operation 1401, method proceeds to operation 1402 by finding the "voting" points on the gray "icon" image for each side of the document depicted in the image. Consequently, operation 1402 finds all positions on the gray "icon" image which could be approximated with straight line segments to represent left, top, right, and bottom sides of the document.

In accordance with one embodiment, operation 1402 achieves its goal by first looking for the "voting" points in the half of the "icon" that corresponds with the current side of interest. For instance, if the current side of interest is the document's top side, the upper part of the "icon" (Y<H/2) is examined while the bottom part of the "icon" (Y·gtoreq·H/2) is ignored.

Within the selected half of the "icon," operation 1402 would then compute the intensity gradient (contrast) in the correct direction of each pixel. This is accomplished in some embodiments by considering a small window centered in the pixel and, then, breaking the window into an expected "background" half where the gray intensity is smaller (i.e. where it is supposed to be darker) and into an expected "doc" half where the gray intensity is higher (i.e. where it is supposed to be whiter). There is a break line between the two halves, either horizontal or vertical depending on side of the document sought to be found. Next the average gray intensity in each half-window is computed, resulting in an average image intensity for the "background" and an average image intensity of the "doc." The intensity gradient of the pixel is calculated by subtracting the average image intensity for the "background" from the average image intensity for the "doc."

Eventually, those pixels with sufficient gray intensity gradient in the correct direction are marked as "voting" points for the selected side. The sufficiency of the actual gray intensity gradient threshold for determining is established experimentally.

Continuing with method 1400, operation 1404 finds candidate sides (i.e. line segments) that potentially represent the sides of the document (i.e. left, top, right, and bottom sides). In order to do so, some embodiments find all subsets within the "voting" points determined in operation 1402 which could be approximated by a straight line segment (linear approximation). In many embodiments, the threshold for linear approximation is established experimentally. This subset of lines is defined as the side "candidates." As an assurance that the set of side candidates is never empty, the gray "icon" image's corresponding top, bottom, left, and right sides are also added to the set.

Next, operation 1406 chooses the best candidate for each side of the document from the set of candidates selected in operation 1404, thereby defining the position of the document within the gray "icon" image. Some embodiments use the following process in choosing the best candidate for each side of the document.

The process starts by selecting a quadruple of line segments {L, T, R, B}, where L is one of the candidates for the left side of the document, T is one of the candidates for the top side of the document, R is one of the candidates for the right side of the document, and B is one of the candidates for the bottom side of the document. The process then measures the following characteristics for the quadruple currently selected.

The amount of "voting" points is approximated and measured for all line segments for all four sides. This amount value is based on the assumption that the document's sides are linear and there is a significant color contrast along them. The larger values of this characteristic increase the overall quadruple rank.

The sum of all intensity gradients over all voting points of all line segments is measured. This sum value is also based on the assumption that the document's sides are linear and there is a significant color contrast along them. Again, the larger values of this characteristic increase the overall quadruple rank.

The total length of the segments is measured. This length value is based on the assumption that the document occupies a large portion of the image. Again, the larger values of this characteristic increase the overall quadruple rank.

The maximum of gaps in each corner is measured. For example, the gap in the left/top corner is defined by the distance between the uppermost point in the L-segment and the leftmost point in the T-segment. This maximum value is based on how well the side-candidates suit the assumption that the document's shape is quadrangle. The smaller values of this characteristic increase the overall quadruple rank.

The maximum of two angles between opposite segments (i.e. between L and R, and between T and R) is measured. This maximum value is based on how well the side-candidates suit the assumption that the document's shape is close to parallelogram. The smaller values of this characteristic increase the overall quadruple rank.

The deviation of the quadruple's aspect ratio from the "ideal" document aspect ratio is measured. This characteristic is applicable to documents with a known aspect ratio, e.g. checks. If the aspect ratio is unknown, this characteristic should be excluded from computing the quadruple's rank. The quadruple's aspect ratio is computed as follows: a) Find the quadrangle by intersecting the quadruple's elements; b) Find middle-point of each of the four quadrangle's sides; c) Compute distances between middle-points of opposite sides, say D1 and D2; d) Find the larger of the two ratios: R=max (D1/D2, D2/D1); e) Assuming that the "ideal" document's aspect ratio is known and Min/MaxAspectRatio represent minimum and maximum of the aspect ratio respectively, define the deviation in question as: 0, if MinAspectRatio<=R<=MaxAspectRatio MinAspectRatio-R, if R<MinAspectRatio R-MaxAspectRatio, if R>MaxAspectRatio.

For checks, MinAspectRatio can be set to 2.0 and MaxAspectRatio can be set to 3.0.

This aspect ratio value is based on the assumption that the document's shape is somewhat preserved during the perspective transformation. The smaller values of this characteristic increase the overall quadruple rank.

Following the measurement of the characteristics of the quadruple noted above, the quadruple characteristics are combined into a single value, called the quadruple rank, using weighted linear combination. Positive weights are assigned for the amount of "voting" points, the sum all of intensity gradients, and the total length of the segments. Negatives weights are assigned for maximum gaps in each corner, maximum two angles between opposite segments, and the deviation of the quadruple's aspect ratio. The exact values of each of the weights are established experimentally.

The operations set forth above are repeated for all possible combinations of side candidates, eventually leading to the "best" quadruple, which is the quadruple with the highest rank. The document's corners are defined as intersections of the "best" quadruple's sides (i.e. the best side candidates).

Operation 1408 subsequently defines the corners of the document using the intersections of the best side candidates. A person of ordinary skill in the art would appreciate that these corners can then be located on the original mobile image by transforming the corner locations found on the "icon" using the similarity transformation previously mentioned. Method 1400 concludes at operation 1410 by outputting the locations of the corners defined in operation 1408.

Figure 15A:
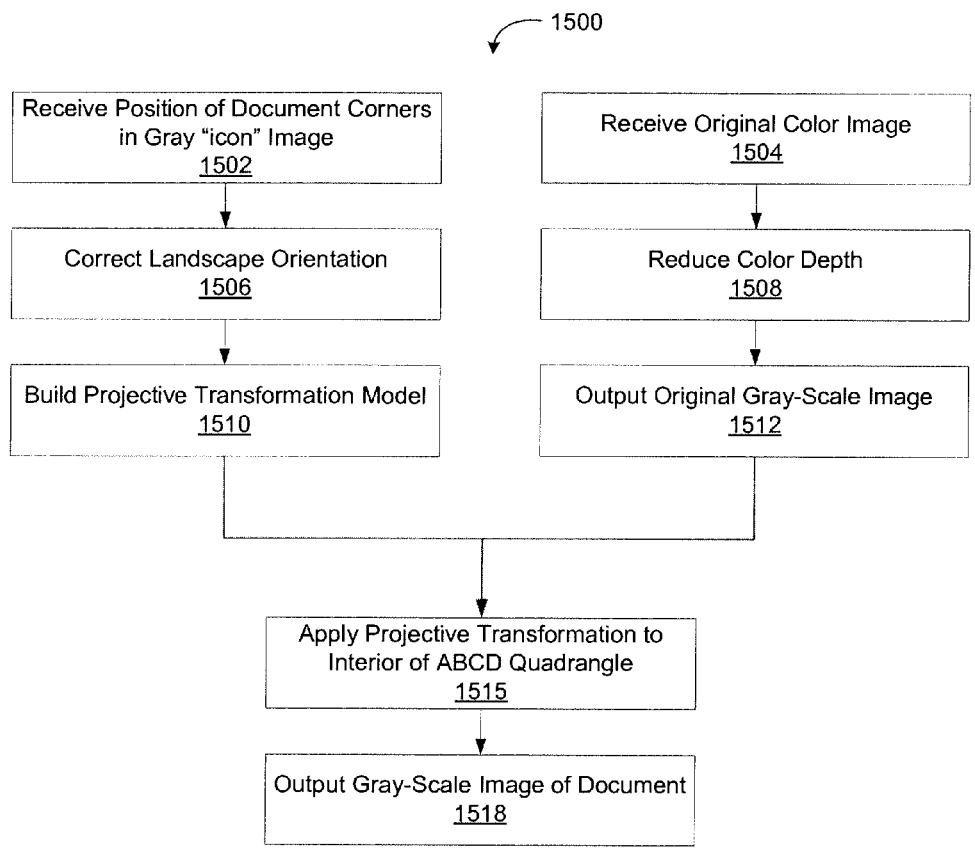
FIG. 15*a* is a flowchart illustrating an example method for geometric correction in accordance with the systems and methods described herein.

With respect to the geometrical correction operation described in operation 1004 of FIG. 10, FIG. 15*a* provides a flowchart that illustrates an example method 1500 for geometric correction. As previously mentioned, geometric correction is needed to correct any possibly perspective distortions that exist in the original mobile image. Additionally, geometric correction can correct the orientation of the documentation within the original mobile image (e.g. document is orientated at 90, 180, or 270 degrees where the right-side-up orientation is 0 degrees). It should be noted that in some embodiments, the orientation of the document depends on the type of document depicted in the mobile image, as well as the fields of relevance on the document.

Figure 15B:
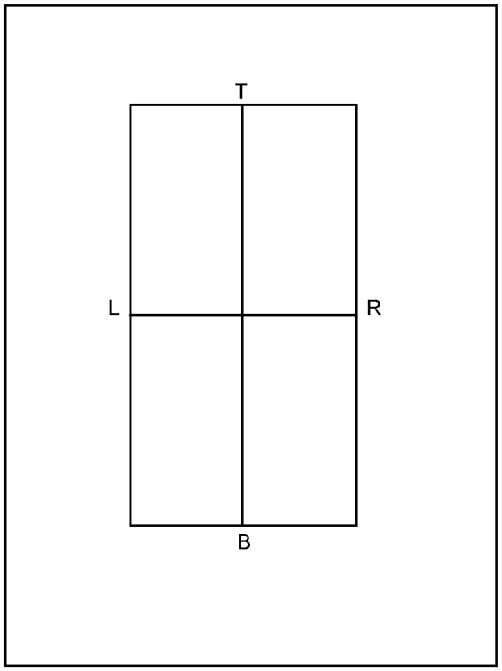
FIG. 15*b* is an example mobile image depicting a check in landscape orientation.

In instances where the document is in landscape orientation (90 or 270 degrees), as illustrated by the check in FIG. 15*b*, geometric correction is suitable for correcting the orientation of the document. Where the document is at 180 degree orientation, detection of the 180 degree orientation and its subsequent correction are suitable when attempting to locate an object of relevance on the document that is known to be at a specific location. For example, a MICR-line on a financial document can be one relevant object since the MICR-line is usually located at a specific location on such documents. Hence, where the financial document is a check, the MICR-line may function as the relevant object (since it is consistently located at the bottom of the check) to determine the current orientation of the check within the mobile image. In some embodiments, the object of relevance on a document depends on the document's type. For example, where the document is a contract, the object of relevance may be a notary seal, signature, or watermark positioned at a known position on the contract. Greater detail regarding correction of a document (specifically, a check) having upside-down orientation (180 degree orientation) is provided with respect to FIGS. 17*a* and 17*c*.

A mathematical model of projective transformations is built and converts the distorted image into a rectangle-shaped image of predefined size. For instance, where the document depicted in mobile image is a check, the predefined size is established as 1200×560 pixels, which is roughly equivalent to the dimensions of a personal check scanned at 200 DPI.

Continuing with reference to method 1500, there are two separate paths of operations that are either performed sequentially or concurrently, the outputs of which are eventually utilized in the final output of method 1500. One path of operations begins at operation 1504 where method 1500 receives the original mobile image in color. Operation 1508 then reduces the color depth of the original mobile image from a color image with 24 bit per a pixel (24 bit/pixel) to a gray-scale image with 8 bit per a pixel (8 bit/pixel). This image is subsequently outputted to operation 1516 by operation 1512.

If automatic document detection method 1101 shown in FIG. 11*c* is used, steps 1504 and 1508 may not be necessary as the server already receives a color reduced image of the original size.

The other path of operations begins at operation 1502, where method 1500 receives the positions of the document's corners within the gray "icon" image produced by method 1300. Based off the location of the corners, operation 1506 then determines the orientation of the document and corrects the orientation. In some embodiments, this operation uses the corner locations to measure the aspect ratio of the document within the original image. Subsequently, operation 1506 finds a middle-point between each set of corners, wherein each set of corners corresponds to one of the four sides of the depicted document, resulting in the left (L), top (T), right (R), and bottom (B) middle-points. The distance between the L to R middle-points and the T to B middle points are then compared to determine which of the two pairs has the larger distance. This provides operation 1506 with the orientation of the document.

In some instances, the correct orientation of the document depends on the type of document that is detected. For example, as illustrated in FIG. 15*b*, where the document of interest is a check, the document is determined to be in landscape orientation when the distance between the top middle-point and bottom middle-point is larger than the distance between the left middle-point and the right middle-point. The opposite might be true for other types of documents.

If operation 1506 determines an orientation correction is necessary, the corners of the document are shifted in a loop, clock-wise in some embodiments and counter-clockwise in other embodiments.

At operation 1510, method 1500 builds the projective transformation to map the image of the document to a predefined target image size of width of W pixels and height of H pixels. In some embodiments, the projective transformation maps the corners A, B, C, and D of the document as follows: corner A to (0,0), corner B to (W,0), corner C to (W,H), and corner D to (0,H). Algorithms for building projective transformation are commonly known and used amongst those of ordinary skill in the art.

Figure 15C:
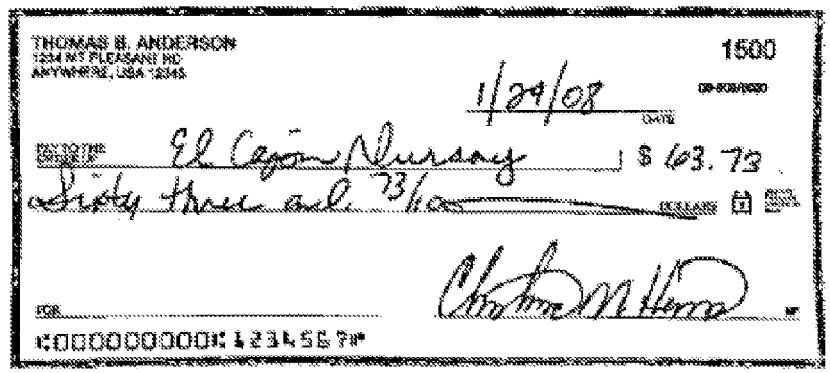
FIG. 15*c* is a mobile image depicting an example of the mobile image of FIG. 11*b* after a geometric correction operation in accordance with the systems and methods described herein.

At operation 1516, the projective transformation created during operation 1514 is applied to the mobile image in gray-scale as outputted from operation 1512. The projective transformation as applied to the gray-scale image of operation 1512 results in all the pixels within the quadrangle ABCD depicted in the gray-scale image mapping to a geometrically corrected, gray-scale image of the document alone. FIG. 15c is an example gray-scale image of the document depicted in FIG. 11b once a geometrical correction operation is applied thereto. Method 1500 concludes at operation 1518 where the gray-scale image of the document is outputted to the next operation.

Figure 16A:
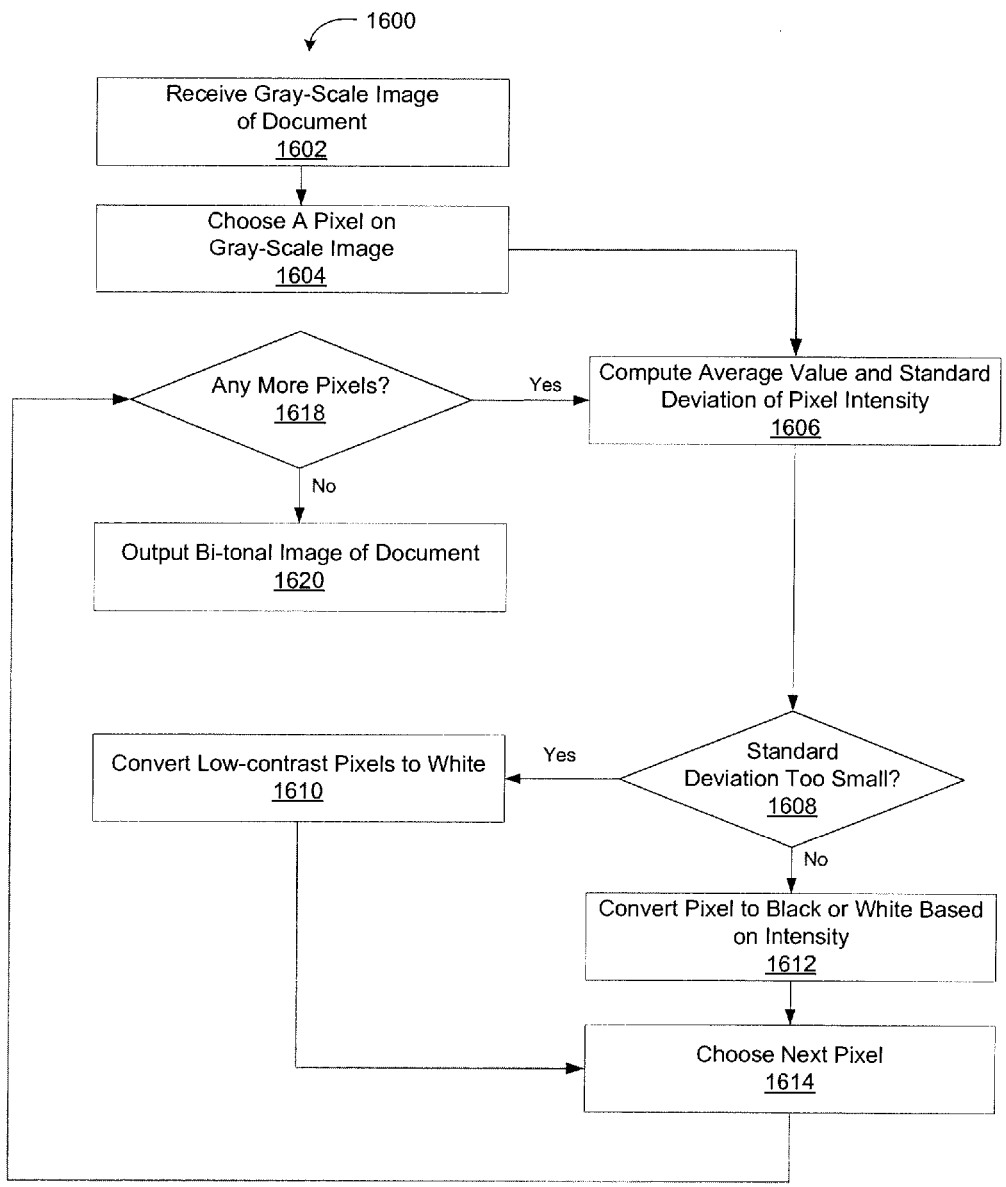
FIG. 16*a* is a flowchart illustrating an example method for binarization in accordance with the systems and methods described herein.

Now with respect to the binarization operation described in operation 1006 of FIG. 10, a flowchart illustrating an example method 1600 for binarization is provided in FIG. 16a. A binarization operation generates a bi-tonal image with color depth of 1 bit per a pixel (1 bit/pixel). In the case of documents, such as checks and deposit coupons, a bi-tonal image is required for processing by automated systems, such as Remote Deposit systems. In addition, many image processing engines require such an image as input. Method 1600 illustrates how the binarization of a gray-scale image of a document as produced by geometrical operation 1004 is achieved. This particular embodiment uses a variation of well-known Niblack's method of binarization. As such, there is an assumption that the gray-scale image received has a the dimensions W pixels×H pixels and an intensity function $I(x, y)$ gives the intensity of a pixel at location (x,y) in terms one of 256 possible gray-shade values (8 bit/pixel). The binarization operation will convert the 256 gray-shade value to a 2 shade value (1 bit/pixel), using an intensity function $B(x,y)$. In addition, to apply the method, a sliding window with dimensions w pixels×h pixels is defined and a threshold T for local (in-window) standard deviation of gray image intensity $I(x,y)$ is defined. The values of w, h, and T are all experimentally determined.

Once method 1600 receives the gray-scale image of the document at operation 1602, the method 1600 chooses a pixel $p(x,y)$ within the image at operation 1604. The method 1600 computes the average (mean) value ave and standard deviation a of the chosen pixel's intensity $I(x,y)$ within the w×h current window location (neighborhood) of pixel $p(x,y)$ at operation 1606. If the standard deviation σ is determined to be too small at operation 1608 (i.e. σ<T), pixel $p(x,y)$ is considered to be low-contrast and, thus, part of the background. Accordingly, at operation 1610, low-contrast pixels are converted to white (i.e. set $B(x,y)$ set to 1, which is white). However, if the deviation σ is determined to be larger or equal to the threshold T (i.e. σ≥T), the pixel $p(x,y)$ is considered to be part of the foreground. In operation 1612, if $I(p)<ave-k*σ$, pixel p is considered to be a foreground pixel and therefore $B(x,y)$ is set to 0 (black). Otherwise, the pixel is treated as background (and therefore $B(x,y)$ is set to 1). In the formula above, k is an experimentally established coefficient.

Figure 16B:
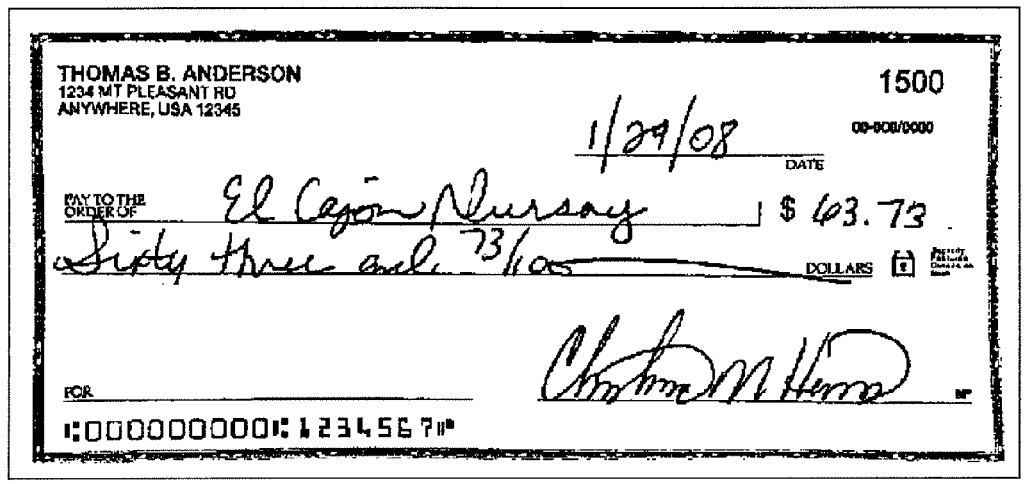
FIG. 16*b* is a mobile image depicting an example of the mobile image of FIG. 15*c* after it has been converted to a bi-tonal image by a binarization operation in accordance with the systems and methods described herein.

Subsequent to the conversion of the pixel at either operation 1610 or operation 1612, the next pixel is chosen at operation 1614, and operation 1606 is repeated until all the gray-scale pixels (8 bit/pixel) are converted to a bi-tonal pixel (1 bit/pixel). However, if no more pixels remain to be converted 1618, the bi-tonal image of the document is then outputted at operation 1620. FIG. 16b illustrates an example image of the check illustrated in FIG. 15c subsequent to a binarization operation.

Figure 16C:
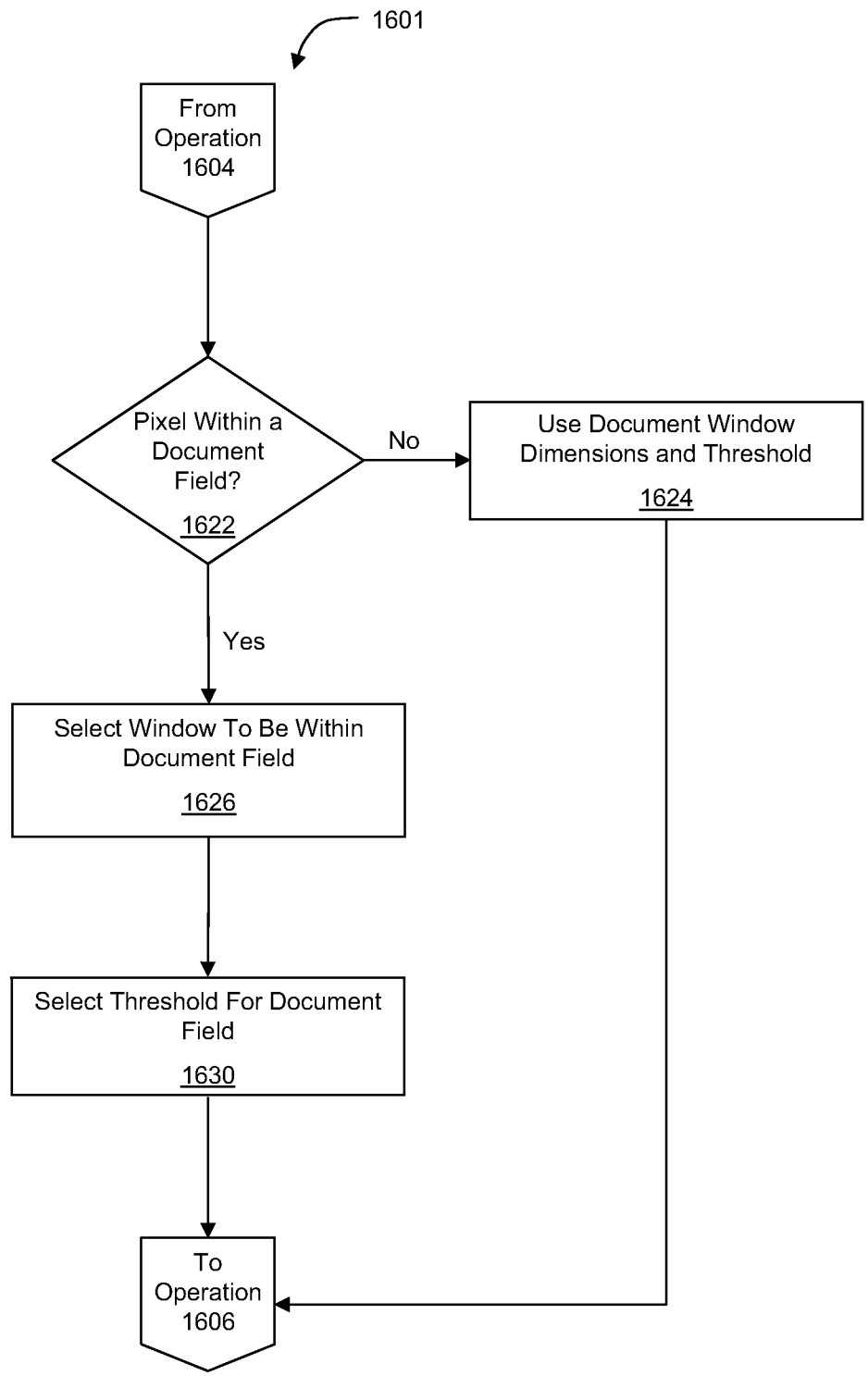
FIG. 16*c* is a flowchart illustrating additional operations to the method for binarization of FIG. 16*a*.

Now referring to FIG. 16c, shown is a flowchart illustrating additional operations 1601 that may be incorporated into method 1600 to provide for improved binarization of an image that may be used for further processing. Additional operations 1601 provide refined definition to the sliding window and threshold that are used in the above-described binarization process to improve the quality of the bi-tonal image within select document fields. Additional operations 1601 may be performed as part of binarization operation 1006 or part of outputting a bi-tonal image in operation 1012 of FIG. 10. Additional operations 1601 may be more suitable for use in operation 1012 where document fields may be more clearly defined. Additional operations 1601 provide an improved bi-tonal image where fields of the document may be later subjected to computer recognition techniques, such as, for example, OCR or hand writing recognition.

Additional operations 1601 are performed after choosing a pixel on the gray-scale image in operation 1604. It is then determined whether the pixel is located within a document field in the image. A document field is an area of the document where information is expected to be located on the document. In the case of a check, for example, a rectangular area where the MICR line is expected may be a document field. Other document fields on a check may include, without limitation, the courtesy amount 102, the legal amount 104, date 110, and payee 108. If the pixel is not within a document field then, at operation 1624, the window and threshold are selected that are used for the document as described above for processing in operation 1606.

If the pixel is determined to be within a document field then the window is selected to be within the document field at operation 1626. The size of the window may be determined experimentally but the size of the window should not extend beyond the bounds of the document field in order to avoid capturing features of the background of the document within the window. Each document field may have its own corresponding window size. By restricting the window to the document field, background artifacts outside the relevant document field will not add noise to the binarization process. After the window size is selected, the window may be positioned to place the chosen pixel near the center of the window.

Some embodiments may further include operation 1628 for selecting a threshold for the document field of the chosen pixel. The threshold may be experimentally determined, and each document field may have its own corresponding threshold. Selecting a threshold for a document field allows the binarization process to optimize machine processing of the information in the document fields.

Figure 17A:
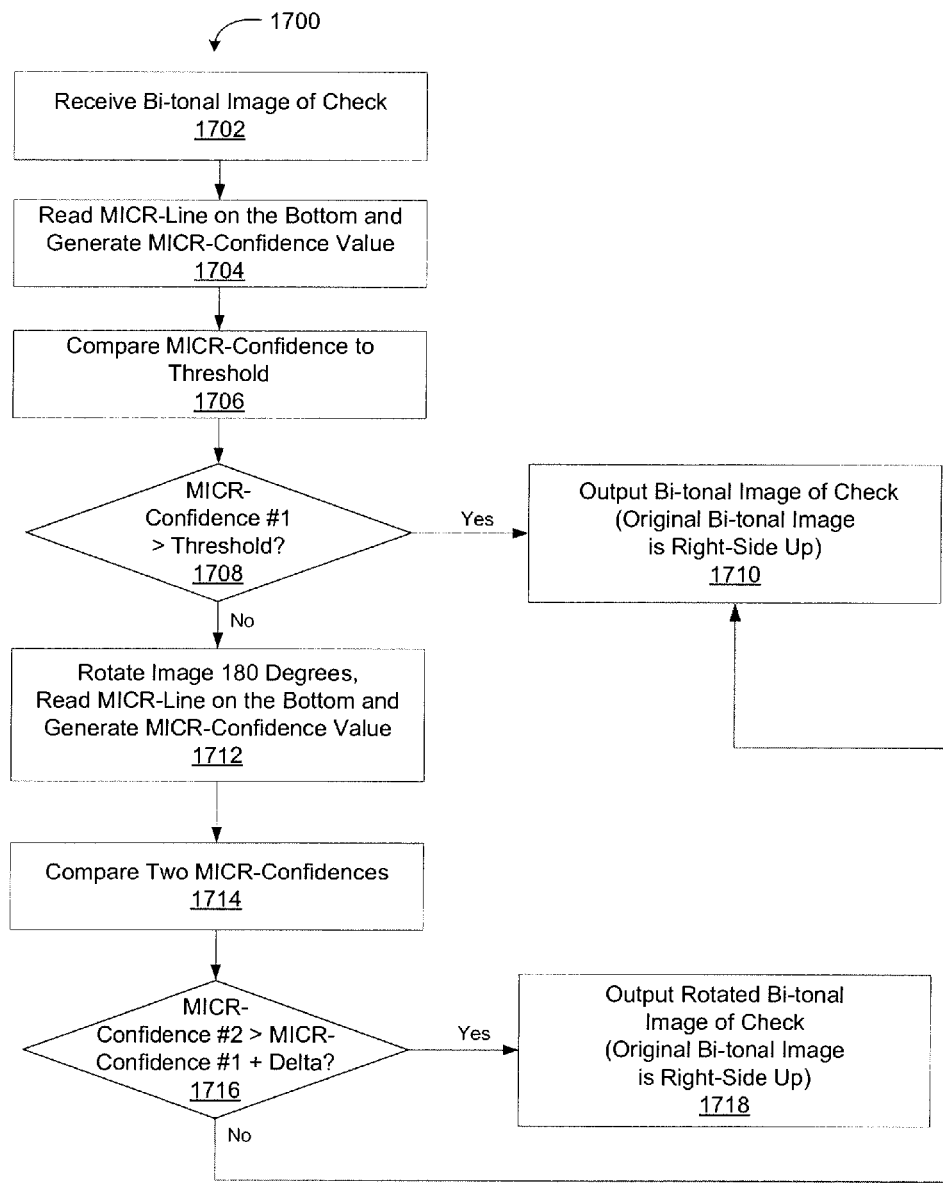
FIG. 17*a* is a flowchart illustrating a known method for correcting the upside-down orientation of a document within a mobile image in accordance with the systems and methods described herein.
Figure 17B:
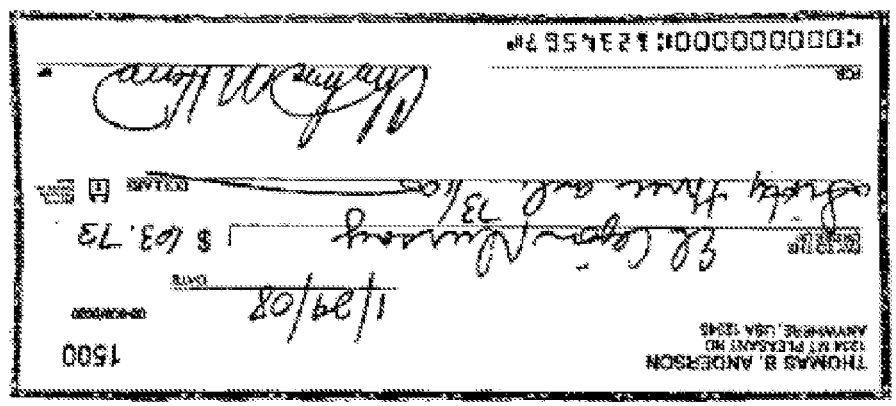
FIG. 17*b* is an example bi-tonal image depicting a check in an upside-down orientation.

With respect to the orientation correction operation 1008 previously described in FIG. 10, FIG. 17a provides a flowchart illustrating a known method for correcting the upside-down orientation of a document within an image. Specifically, FIG. 17a illustrates an method 1700 for correcting the upside-down orientation of a check within a bi-tonal image. FIG. 17b depicts an example bi-tonal image of a check in an upside-down orientation. A person of ordinary skill in the art would understand and appreciate that method 1700 could operate differently for other types of documents (e.g. deposit coupons).

As previously noted, the geometric correction operation as described in FIG. 15 is one method for correcting a document having landscape orientation within the mobile image. However, even after the landscape orientation correction, the document still may remain in upside-down orientation. In order to the correct upside-down orientation for certain documents, some embodiments require the image containing the document be binarized beforehand. Hence, the orientation correction operation 1008 as illustrated in FIG. 10 usually follows the binarization operation of 1006.

Upon receiving the bi-tonal image of the check at operation 1702, method 1700 reads the MICR-line at the bottom of the bi-tonal check image at operation 1704 and generates a MICR-confidence value. This MICR-confidence value (MC1) is compared to a threshold value T at operation 1706 to determine whether the check is right-side-up. If MC1>T at operation 1708, then the bi-tonal image of the check is right side up and is outputted at operation 1710.

However, if MC1≤T at operation 1708, the image is rotated 180 degrees at operation 1712, the MICR-line at the bottom read again, and a new MICR-confidence value generated (MC2). The rotation of the image by 180 degree is done by methods commonly-known in the art. The MICR-confidence value after rotation (MC2) is compared to the previous MICR-confidence value (MC1) plus a Delta at operation 1714 to determine if the check is now right-side-up. If MC2>MC1+Delta at operation 1716, the rotated bi-tonal image has the check right-side-up and, thus, the rotated image is outputted at operation 1718. Otherwise, if MC2≤MC1+ Delta at operation 1716, the original bi-tonal image of the check is right-side-up and outputted at operation 1710. Delta is a positive value selected experimentally that reflects a higher apriori probability of the document initially being right-side-up than upside-down.

Figure 17C:
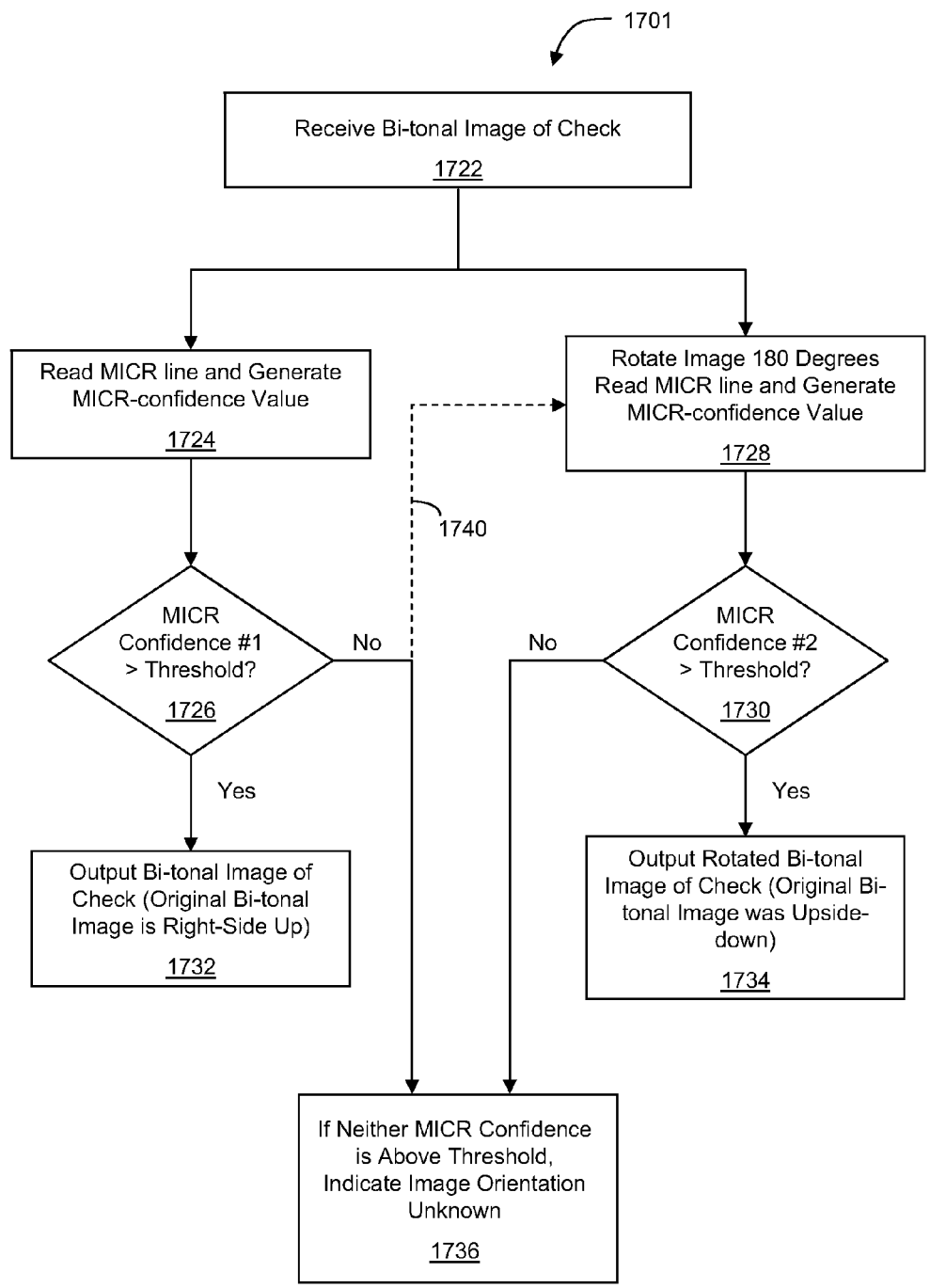
FIG. 17c is a flowchart illustrating an improved method for correcting the upside-down orientation of a document within a mobile image or indicating if orientation is unknown.

Now referring to FIG. 17c, provided is a flowchart illustrating an improved method for correcting the upside-down orientation of a document within an image. Specifically, FIG. 17c illustrates a method 1701 that provides improved speed and indicates if the MICR line of the document is unreadable. Some steps of method 1701 may be performed in parallel to more quickly determine whether the image may be correctly oriented. Another improvement over method 1700 is providing an indication that the bi-tonal image cannot be correctly oriented based-on MICR line information. Since the MICR line is used for later processing (e.g. image processing for size correction and reading financial account information), an indication that the MICR line cannot be read may be used to discard the image or alert the user of the mobile device that the image is not accepted.

Method 1701 commences upon receiving the bi-tonal image of the check at operation 1722. Next, the MICR line is read at the expected location of the MICR line at the bottom of the bi-tonal check image at operation 1724 and a MICR-confidence value is generated. This MICR-confidence value (MICR-Conf1) is compared to a threshold value T at operation 1726 to determine if the MICR-confidence is above the threshold value. If the MICR-confidence is above the threshold it is determined that the original bi-tonal image of the check is right-side up at operation 1732 and the original bi-tonal image of the check is output. Alternatively, operation 1732 may simply provide an indication in the form of setting/ clearing a flag associated with the bi-tonal image (e.g. an upside-down flag may be cleared in operation 1732 to indicate that the image is correctly oriented).

At operation 1728, the bi-tonal image is rotated 180 degrees, the MICR line at the bottom of the check is read again, and a new MICR-confidence value is generated (MICR-Conf2). The MICR-confidence value after rotation (MICR-Conf2) is compared to the threshold value T at operation 1730 to determine if the MICR-confidence is above the threshold value. If the MICR-confidence is above the threshold it is determined that the original bi-tonal image of the check is upside-down at operation 1734 and the 180 degree rotated bi-tonal image of the check is output. Alternatively, operation 1734 may simply provide an indication in the form of setting/clearing a flag associated with the bi-tonal image (e.g. an upside-down flag may be set in operation 1734 to indicate that the bi-tonal image is upside-down).

Operations 1724 and 1726 may be performed in parallel with operations 1728 and 1730 in order to quickly determine whether both MICR confidence readings are below the threshold T. By performing both operations in parallel, the mobile device may be provided with faster feedback from the server to indicate the suitability of the images provided from the mobile device. In addition, by comparing the MICR confidence to a threshold in both orientations, false positives may be avoided where it is unknown if the image is correctly oriented.

If the MICR confidence of the original and rotated images are both not above the threshold, it is indicated that the orientation of the image is unknown at operation 1736. A flag may be set that is associated with the bi-tonal image to indicate that orientation is unknown. In some embodiments, the bi-tonal image may then be provided to an alternative orientation correction module that relies on another feature of the document to correct orientation. If the image is expected or required to have a legible MICR line, the image may be discarded and the mobile device can be alerted that the image is not acceptable.

An alternative sequential embodiment is also shown in FIG. 17c as path 1740 to operation 1728. In this embodiment, operation 1728 performed on the rotated image is only performed if the MICR confidence of the original image is not above the threshold. If the MICR Confidence of the original bi-tonal image is not above the threshold, the sequential embodiment may proceed along "No" path 1740 of the flowchart to operation 1728 where the bi-tonal image is then rotated and the second MICR confidence is generated.

Other embodiments may rely on the number of MICR characters that can be read as a form of MICR confidence. For example, at operation 1724 it could be determined how many MICR characters were read, and then at operation 1726 the threshold can be number of MICR characters that are expected, which is then compared with the actual number of MICR characters read.

Figure 18A:
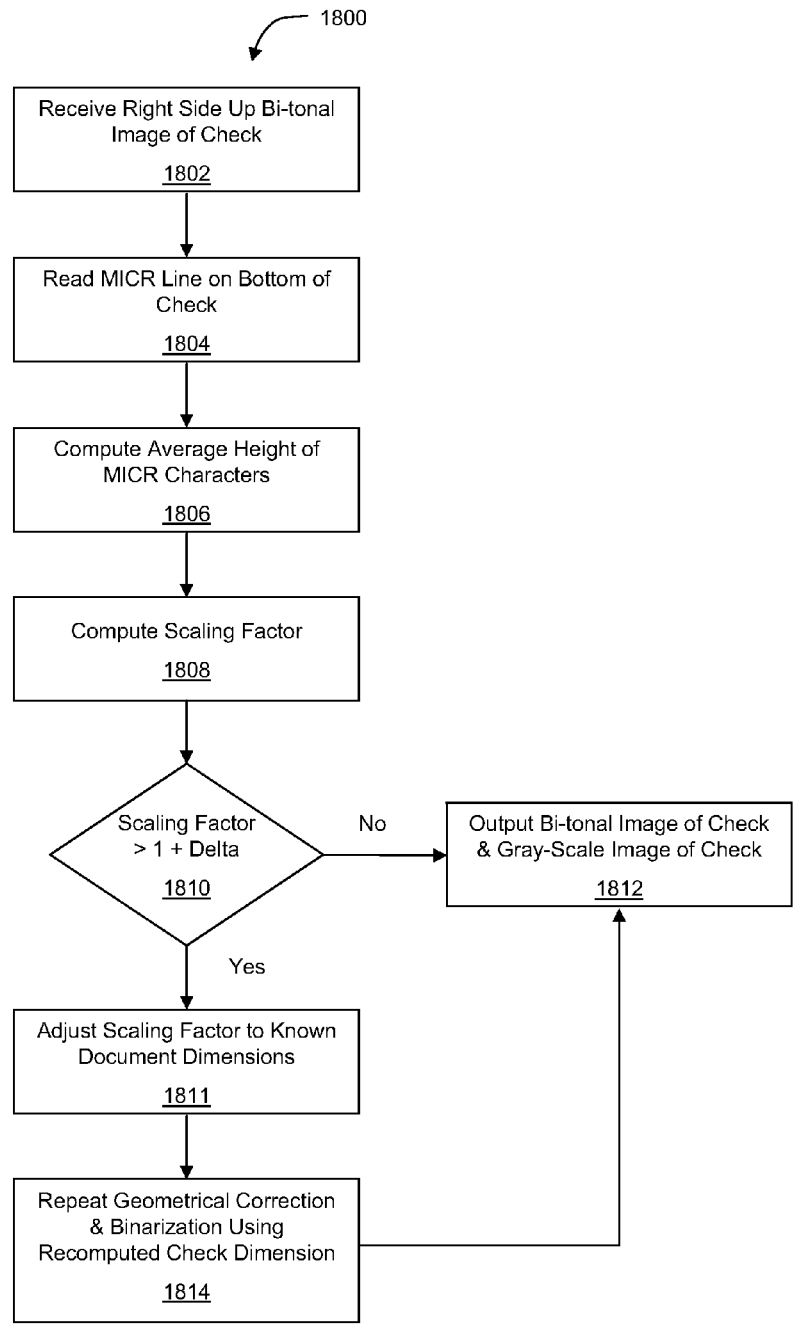
FIG. 18a is a flowchart illustrating an example method for size correction of an image using height of MICR characters in accordance with the systems and methods described herein.
Figure 18B:
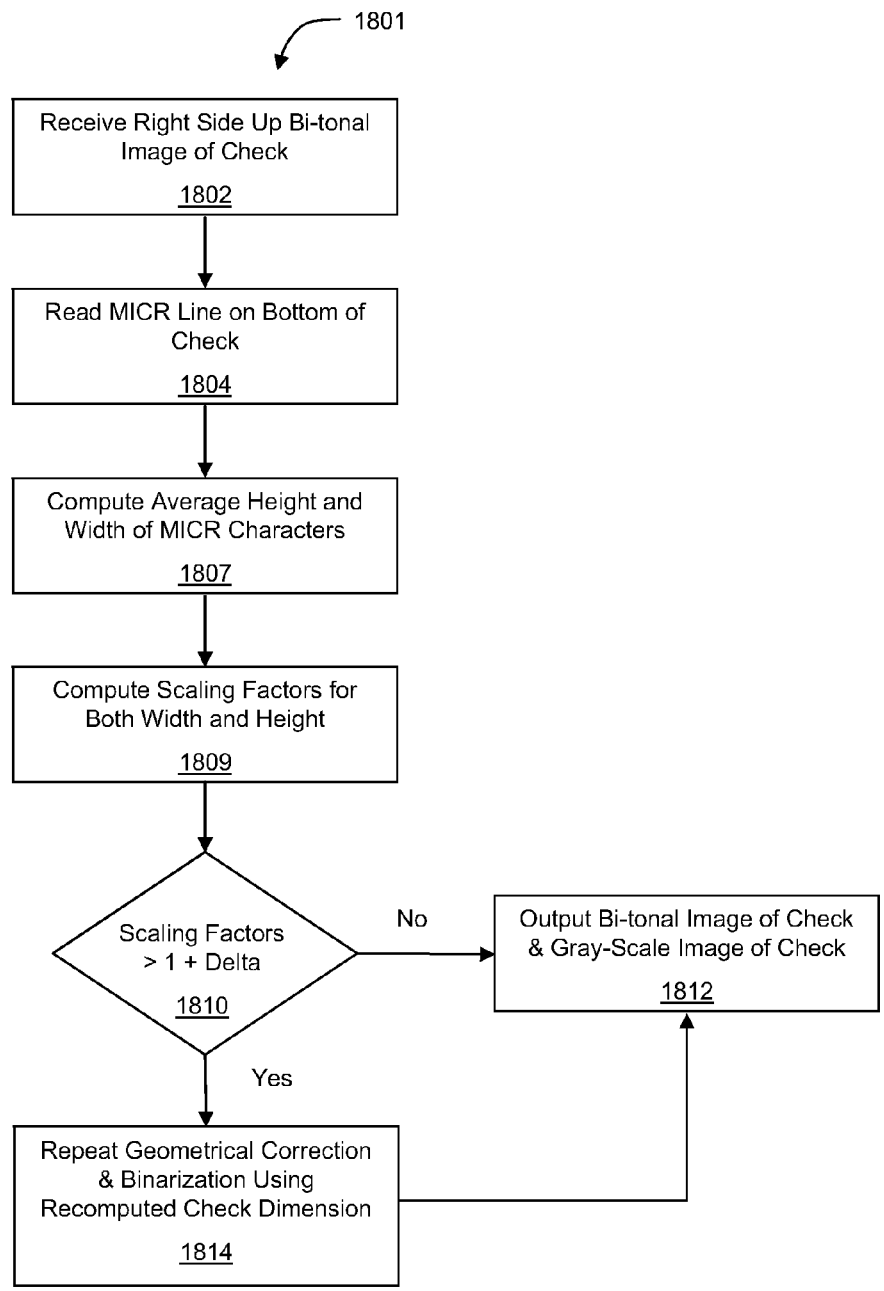
FIG. 18b is a flowchart illustrating an example method for size correction an image using height and width of MICR characters in accordance with the systems and methods described herein.

With respect to the size correction operation 1010 illustrated in FIG. 10, FIGS. 18a and 18b provides a flowchart illustrating an example method for size correction of an image. Specifically, FIGS. 18a and 18b illustrate example methods 1800, 1801 for correcting the size of a check within a bi-tonal image, where the check is oriented right-side-up. A person of ordinary skill in the art would understand and appreciate that methods 1800, 1801 could operate differently for other types of documents (e.g. deposit coupons).

Since many image processing engines are sensitive to image size, it is crucial that the size of the document image be corrected before it can be properly processed. For example, a form identification engine may rely on the document size as an important characteristic for identifying the type of document that is being processed. Generally, for financial documents such as checks, the image size should be equivalent to the image size produced by a standard scanner running at 200 DPI.

In addition, where the document is a check, during the geometric correction operation the geometrically corrected predefined image size is at 1200×560 pixels (See, for e.g., FIG. 15 description), which is roughly equivalent to the size of a personal check scanned at 200 DPI. However, the size of business checks tend to vary significantly, with most business checks having a width greater than 1200 pixels when scanned at 200 DPI. Some business checks are known to be as wide as 8.75", which translates to be 1750 pixels in width when scanned at 200 DPI. Hence, in order to restore the size of business checks and other check variations that have been geometrically corrected at a predefined image size of 1200× 560 pixels, the size correction operation is performed.

Referring now to FIG. 18a, after receiving a bi-tonal image containing a check that is orientated right-side-up at operation 1802, method 1800 reads the MICR-line at the bottom of the check at operation 1804. This allows method 1800 to compute the average height of the MICR-characters at operation 1806. In doing so, the computed average height gets compared to the height of a MICR-character at 200 DPI at operation 1808, and a scaling factor is computed accordingly. The scaling factor SF is computed as follows:

$$SF=H200/AH, \quad (eq. 7)$$

where AH is the average height of the MICR-characters found; and H200 is the corresponding "theoretical" height value based on the ANSI x9.37 standard (Specifications for Electronic Exchange of Check and Image Data) at 200 DPI.

Method 1800 uses the scaling factor at operation 1810 to determine whether the bi-tonal image of the check requires size correction. If the scaling SF is determined to be less than or equal to 1.0+Delta, then method 1800 outputs the most recent versions of the check's bi-tonal image and the check's the gray-scale image at operation 1812. Delta defines the system's tolerance to wrong image size.

If, however, the scaling factor SF is determined to be higher than 1.0+Delta, then at operation 1811 the preliminary dimensions of the check are computed as follows:

$$AR=HS/WS \quad (eq. 8)$$

$$H'=H*SF \quad (eq. 9)$$

$$W'=H'/AR, \quad (eq. 10)$$

where HS and WS are the height and width of the check snippet found on the original image; AR is the check aspect ratio which we want to maintain while changing the size; W is the width of geometrically corrected image before it's size is adjusted; W' is the preliminary adjusted check's width in pixels; and preliminary H' is the adjusted check's height in pixels.

The preliminary height and width (H' and W') are then compared to the nearest check known check dimensions at 200 DPI to adjust the scaling factor. For example, if H' and W' are calculated to correspond to 2.48" by 4.92", these dimensions are closest to a known check measurement of 2.5" by 5". Since many check dimensions are multiples of ⅛th of an inch, alternative embodiments may simply round the expected dimensions of the check to the nearest ⅛th of an inch to determine the nearest known check dimensions. The scaling factor may then be adjusted as follows:

$$AFH=HNK/H' \quad (eq. 11)$$

$$AFW=WNK/W' \quad (eq. 12)$$

$$H''=AFH*H' \quad (eq. 13)$$

$$W''=AFW*W' \quad (eq. 14)$$

where AFH and AFW are the adjustment factors applied to the height and width respectively; HNK and WNK is the nearest known height and width, respectively; H" is the final adjusted check's height in pixels; and W" is the final adjusted check's width in pixels. Since separate adjustment factors are applied to the height and width, small errors in the aspect ratio of the image may be corrected.

Subsequent to re-computing the final dimensions, operation 1814 repeats geometrical correction and binarization using the newly dimensioned check image. Following the repeated operations, operation 1812 outputs the resulting bi-tonal image of the check and gray-scale image of the check.

Referring now to FIG. 18b, shown is a flowchart illustrating an example method 1801 for size correction of an image that relies on using both height and width measurements to scale the image. Operations that correspond to operations shown in FIG. 18a are similarly numbered. Method 1801 provides for improved scaling when the aspect ratio of the geometrically corrected image does not correspond to the original document. Rather than relying on the aspect ratio of the image to perform size correction, both height and width scaling factor are computed.

At operation 1807, the average height and width of the MICR characters are calculated. The computed average height and width get compared to the size of a MICR character at 200 DPI at operation 1809, and a scaling factor is computed accordingly. The scaling factors are computed as follows:

$$SFH=H200/AH \quad (eq. 7)$$

and $$SFW=W200/AW \quad (eq. 15)$$

where SFH and SFW are the scaling factors to be applied to the height and width respectively; AW is the average width of the MICR-characters found; and W200 is the corresponding "theoretical" width value based on the ANSI x9.37 standard at 200 DPI. The final height and width may then be calculated independent of each other (i.e. not related by aspect ratio) as follows:

$$H''=SFH*H \quad (eq. 16)$$

$$W''=SFW*W \quad (eq. 17).$$

As an alternative to computing the average width at operations 1806 and 1807, improved accuracy may be obtained by using distances relative to MICR symbols, such as, for example, the transit symbol 113 or on-us symbol 115 shown in FIG. 1. Checks use standard distances between certain MICR symbols or between MICR symbols and the leading edge (right edge of front facing check) or bottom edge of the document. A scaling factor can be computed using the theoretical distance based on the standard and measured distance in the image. Since these distances are larger than the width of a MICR character, scaling using distance relative to MICR symbols is less prone to error, and thus more accurate.

As an example, at operation 1804, the MICR line is read to determine the distance between two transit symbols. The scaling factor SF is then computed, at operations 1808 or 1809, as follows:

$$SF=TDist200/MD, \quad (eq. 18)$$

where MD is the measured distance between the transit symbols; and TDist200 is the corresponding distance according to the check MICR standard at 200 DPI. The scaling factor may be calculated similarly using the measured distance from the leading edge of the check to the first transit symbol and the distance according to the standard at 200 DPI. Some embodiments may use a number of measurements on the check image to compute a number of scaling factors that may then be averaged to compute the scaling factor to apply to the image. Some embodiments may only select only one of a window or threshold, while other embodiments may select both a window and threshold.

Figure 19:
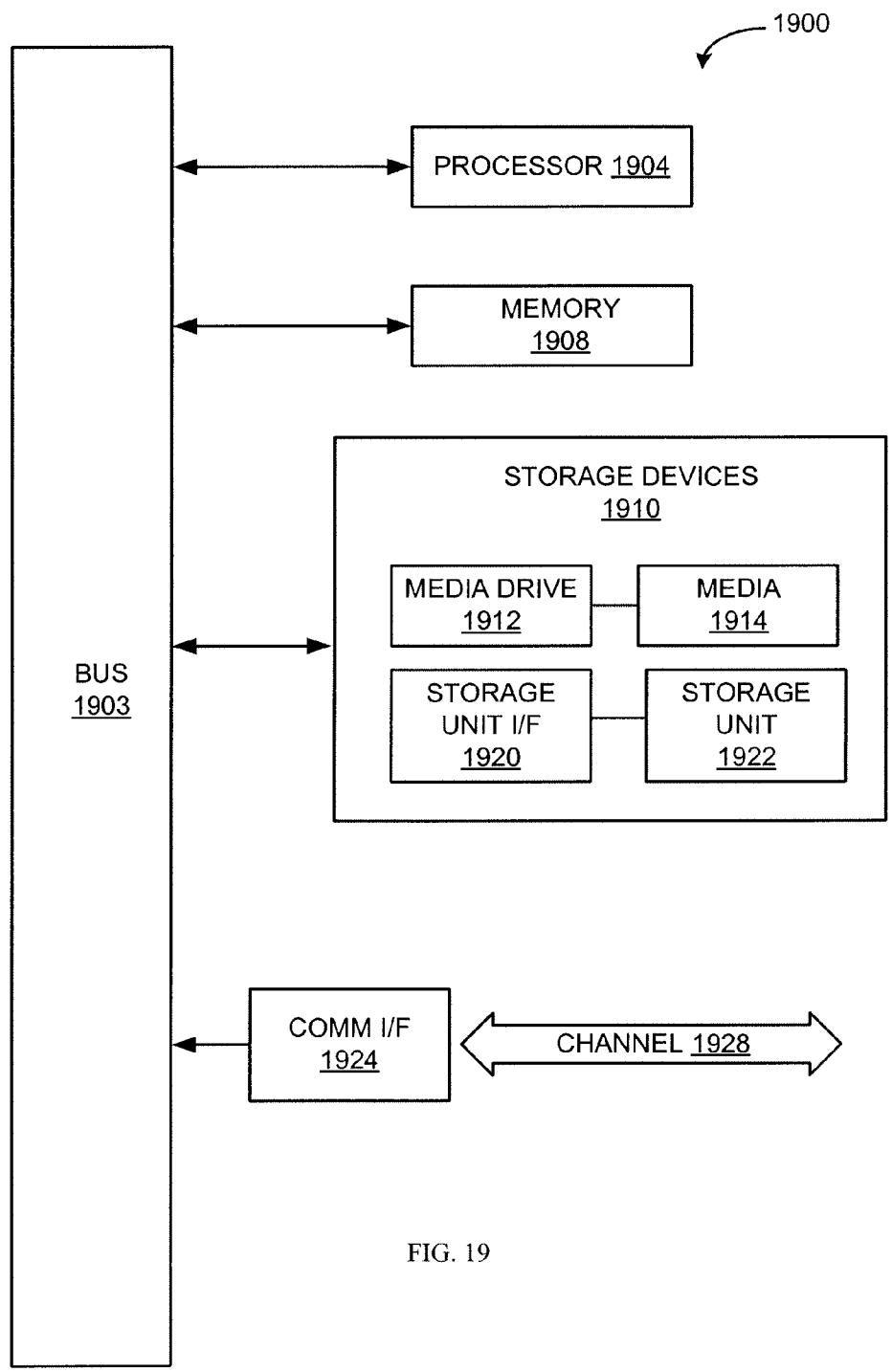
FIG. 19 is a simplified block diagram illustrating an example-computing module.

As used herein, the term module might describe a given unit of functionality that can be performed. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of processes used in conjunction with the operations described herein are implemented in whole or in part using software, in one embodiment, these software elements can be implemented to operate with a computing or processing module capable of carrying out the functionality described with respect thereto. One such example-computing module is shown in FIG. 19. Various embodiments are described in terms of this example-computing module 1900. After reading this description, it will become apparent to a person skilled in the relevant art how to implement the invention using other computing modules or architectures.

Referring now to FIG. 19, computing module 1900 may represent, for example, computing or processing capabilities found within desktop, laptop and notebook computers; mainframes, supercomputers, workstations or servers; or any other type of special-purpose or general-purpose computing devices as may be desirable or appropriate for a given application or environment. Computing module 1900 might also represent computing capabilities embedded within or otherwise available to a given device. For example, a computing module might be found in other electronic devices. Computing module 1900 might include, for example, one or more processors or processing devices, such as a processor 1904. Processor 1904 might be implemented using a general-purpose or special-purpose processing engine such as, for example, a microprocessor, controller, or other control logic.

Computing module 1900 might also include one or more memory modules, referred to as main memory 1908. For example, random access memory (RAM) or other dynamic memory might be used for storing information and instructions to be executed by processor 1904. Main memory 1908 might also be used for storing temporary variables or other intermediate information during execution of instructions by processor 1904. Computing module 1900 might likewise include a read only memory ("ROM") or other static storage device coupled to bus 1902 for storing static information and instructions for processor 1904.

The computing module 1900 might also include one or more various forms of information storage mechanism 1910, which might include, for example, a media drive 1912 and a storage unit interface 1920. The media drive 1912 might include a drive or other mechanism to support fixed or removable storage media 1914. For example, a hard disk drive, a floppy disk drive, a magnetic tape drive, an optical disk drive, a CD or DVD drive (R or RW), or other removable or fixed media drive. Accordingly, storage media 1914 might include, for example, a hard disk, a floppy disk, magnetic tape, cartridge, optical disk, a CD or DVD, or other fixed or removable medium that is read by, written to or accessed by media drive 1912. As these examples illustrate, the storage media 1914 can include a computer usable storage medium having stored therein particular computer software or data.

In alternative embodiments, information storage mechanism 1910 might include other similar instrumentalities for allowing computer programs or other instructions or data to be loaded into computing module 1900. Such instrumentalities might include, for example, a fixed or removable storage unit 1922 and an interface 1920. Examples of such storage units 1922 and interfaces 1920 can include a program cartridge and cartridge interface, a removable memory (for example, a flash memory or other removable memory module) and memory slot, a PCMCIA slot and card, and other fixed or removable storage units 1922 and interfaces 1920 that allow software and data to be transferred from the storage unit 1922 to computing module 1900.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMedia, IEEE 802.XX (or other interface), a communications port (such as for example, a USB port, IR port, RS232 port Bluetooth® interface, or other port), or other communications interface. Software and data transferred via communications interface 1924 might typically be carried on signals, which can be electronic, electromagnetic (which includes optical) or other signals capable of being exchanged by a given communications interface 1924. These signals might be provided to communications interface 1924 via a channel 1928. This channel 1928 might carry signals and might be implemented using a wired or wireless communication medium. These signals can deliver the software and data from memory or other storage medium in one computing system to memory or other storage medium in computing system 1900. Some examples of a channel might include a phone line, a cellular link, an RF link, an optical link, a network interface, a local or wide area network, and other wired or wireless communications channels Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMAX, 802.XX or other interface), a communications port (such as for example, a USB port, IR port, RS232 port, Bluetooth interface, or other port), or other communications interface. Software and data transferred via communications interface 1924 might typically be carried on signals, which can be electronic, electromagnetic, optical or other signals capable of being exchanged by a given communications interface 1924. These signals might be provided to communications interface 1924 via a channel 1928. This channel 1928 might carry signals and might be implemented using a wired or wireless medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 1908, storage unit 1920, and media 1914. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1900 to perform features or functions as discussed herein.

While various embodiments have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

What is claimed is:

1. A system for processing of financial documents, the system comprising:
a server configured to: receive a color reduced image from a mobile device;
detect the financial document in the color reduced image, geometrically correct the color reduced image to produce a geometrically correct image, binarize the geometrically correct image to produce a bi-tonal image of the financial document by:
choosing a pixel on the gray-scale image;
determining whether the chosen pixel is located within a document field, and if the chosen pixel is within the document field then:
selecting a window constrained within the document field; and
computing an average value and a standard deviation for the chosen pixel over the window;
determining whether the standard deviation is too small and if it is too small then converting the chosen pixel to white and if it is not too small then converting the chosen pixel to black or white based on an intensity of the chosen pixel; and
choosing another pixel and repeating said computing and determining steps until there are no more pixels to choose; and
correcting the orientation of the bi-tonal image to produce an oriented bi-tonal image, and correct the size of the oriented bi-tonal image to produce an adjusted bi-tonal image.

2. The system of claim 1, wherein the window is selected so that the window does not extend beyond the document field to avoid capturing features of the background of the document within the window.

3. The system of claim 1, wherein if the chosen pixel is within the document field then further selecting a threshold, and wherein said determining operation uses the threshold to determine if the standard deviation is too small.

4. The system of claim 1, wherein the financial document is a check and the document field may be selected from the group consisting of: MICR line, courtesy amount, legal amount, date, signature and payee.

5. A system for processing financial documents, the system comprising:
a server configured to: receive a color reduced image from a mobile device, detect the financial document in the color reduced image, geometrically correct the color reduced image to produce a geometrically correct image, binarize the geometrically correct image to produce a bi-tonal image, correct the orientation of the bi-tonal image to produce an oriented bi-tonal image, and correct the size of the oriented bi-tonal image to produce an adjusted bi-tonal image;
wherein the financial document is a check and correcting the size of the oriented bi-tonal image to produce the adjusted bi-tonal image of the check is by:
reading a MICR line on the bottom of the financial document;
computing an average dimension of the MICR characters, wherein the average dimension is any one of an average height and an average width;
computing a scaling factor based on the average dimension of the MICR characters and an expected height at a selected DPI;
when the scaling factor is not greater than a threshold, outputting the oriented bi-tonal image; and
when the scaling factor is greater than the threshold: computing dimensions for the check based on the scaling factor; repeating said geometric correcting and binarizing; and outputting the adjusted bi-tonal image,
wherein said computing the dimensions for the check further comprises comparing computed dimensions to expected dimensions; adjusting the scaling factor based on the expected dimensions to provide an adjusted scaling factor; and recomputing the computed dimensions for the check based on the adjusted scaling factor, and
wherein the expected dimensions may be any one of known check dimensions or dimensions based on a multiple of ⅛th inch.

6. A system for processing of financial documents, the system comprising:
a server configured to: receive a color reduced image from a mobile device, and to: detect the financial document in the color reduced image, geometrically correct the color reduced image to produce a geometrically correct image, binarize the geometrically correct image to produce a bi-tonal image, correct the orientation of the bi-tonal image to produce an oriented bi-tonal image, and correct the size of the oriented bi-tonal image to produce an adjusted bi-tonal image;

wherein the financial document is a check, correcting the size of the oriented bi-tonal image of the check is by:

reading a MICR line on the bottom of the financial document;

computing an average height and an average width of the MICR characters;

computing a height scaling factor based on the average height of the MICR characters and an expected height at a selected DPI;

computing a width scaling factor based on the average width of the MICR characters and an expected width at a selected DPI;

when the height and width scaling factors are not greater than a threshold, outputting the oriented bi-tonal image; and when the height and width scaling factors are greater than a threshold: computing dimensions for the check based on the height and width scaling factors, scaling a width by the width scaling factor and scaling a height by the height scaling factor; and repeating said geometric correcting and binarizing, and outputting the adjusted bi-tonal image, and wherein scaling the width by the width scaling factor and scaling the height by the height scaling factor corrects a height-to-width aspect ratio of the check.

7. A system for processing of financial documents, the system comprising:

a server configured to; receive a color reduced image from a mobile device, and to: detect the financial document in the color reduced image, geometrically correct the color reduced image to produce a geometrically correct image, binarize the geometrically correct image to produce a bi-tonal image, correct the orientation of the bi-tonal image to produce an oriented bi-tonal image, and correct the size of the oriented bi-tonal image to produce an adjusted bi-tonal image;

wherein the financial document is a check, and correcting the size of the oriented bi-tonal image of the check is by:

reading a MICR line on the bottom of the financial document;

determining a location for MICR symbols;

computing a scaling factor based on a distance between relative MICR symbols and an expected distance between relative MICR symbols at a selected DPI;

when the scaling factor is not greater than a threshold, outputting the oriented bi-tonal image; and when the scaling factor is greater than the threshold: computing dimensions for the check based on the scaling factor; and repeating said geometric correcting and binarizing, and outputting the adjusted bi-tonal image.

8. The system of claim 7 wherein the distance between relative to MICR symbols is the distance between two transit MICR symbols.

9. The system of claim 7 wherein the distance between relative MICR symbols is the distance between a leading edge of the document and at least one transit MICR symbol.

* * * * *